(12) United States Patent
Namiki et al.

(10) Patent No.: US 10,930,037 B2
(45) Date of Patent: Feb. 23, 2021

(54) IMAGE PROCESSING DEVICE FOR DISPLAYING OBJECT DETECTED FROM INPUT PICTURE IMAGE

(71) Applicant: FANUC CORPORATION, Yamanashi (JP)

(72) Inventors: Yuta Namiki, Yamanashi (JP); Fumikazu Warashina, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 15/441,934

(22) Filed: Feb. 24, 2017

(65) Prior Publication Data
US 2017/0249766 A1    Aug. 31, 2017

(30) Foreign Application Priority Data

Feb. 25, 2016 (JP) .............................. JP2016-034774

(51) Int. Cl.
*G06T 11/60* (2006.01)
*G06K 9/62* (2006.01)
*G06K 9/66* (2006.01)

(52) U.S. Cl.
CPC ............ *G06T 11/60* (2013.01); *G06K 9/6254* (2013.01); *G06K 9/6255* (2013.01);
(Continued)

(58) Field of Classification Search
CPC ... G06T 11/60; G06T 7/70; G06T 7/73; G06T 7/74; G06T 7/13; G06T 7/12; G06T 7/11;
(Continued)

(56) References Cited

U.S. PATENT DOCUMENTS 4,642,813 A * 2/1987 Wilder .................... G06T 7/001
   348/125
4,783,829 A * 11/1988 Miyakawa ............... G06K 9/00
   382/199

(Continued)

FOREIGN PATENT DOCUMENTS

CN       104104861 A    10/2014
CN       105279514 A    1/2016
(Continued)

OTHER PUBLICATIONS

"Object Recognition from Local Scale-Invariant Features," David G. Lowe, (Sep. 1999), pp. 1-8.
(Continued)

*Primary Examiner* — Charles L Beard
(74) *Attorney, Agent, or Firm* — RatnerPrestia

(57) ABSTRACT

An image processing device including an object detection unit for detecting one or more images of objects from an input picture image, on the basis of a model pattern of the object, and a detection result display unit for graphically superimposing and displaying a detection result. The detection result display unit includes a first frame for displaying the entire input picture image and a second frame for listing and displaying one or more partial picture images each including an image detected. In the input picture image displayed in the first frame, a detection result is superimposed and displayed on all the detected images, and in the partial picture image displayed in the second frame, a detection result of an image corresponding to each partial picture image is superimposed and displayed.

8 Claims, 20 Drawing Sheets

(52) U.S. Cl.
CPC ......... *G06K 9/6268* (2013.01); *G06K 9/6274* (2013.01); *G06K 9/66* (2013.01); *G06T 2200/24* (2013.01)

(58) Field of Classification Search
CPC ... G06T 7/10; G06T 2200/24; G06T 2207/20; G06T 2207/2016; G06T 2207/20081; G06T 2207/20084; G06T 2207/30242; G06T 7/30; G06T 2207/10056; G06T 2207/20092; G06T 2207/30024; G06K 9/6254; G06K 9/6255; G06K 9/6268; G06K 9/6274; G06K 9/66; G06K 9/4671; G06K 9/468; G06K 9/6209; G06K 9/621; G06K 9/6211; G06K 2009/6213; G06K 9/6217; G06K 9/0014; G06K 9/00771; G06K 9/6202; G06K 9/6292; G06K 9/4604; G06K 9/6215; G06K 2209/19; G06K 9/74; G06K 9/4609; G02B 21/367; G06F 19/321; G06F 16/583; G06F 16/50; G06N 7/005; G06N 3/08; B25J 9/1697
See application file for complete search history.

(56) References Cited

U.S. PATENT DOCUMENTS

| | | | | |
|---|---|---|---|---|
| 5,033,099 A * | 7/1991 | Yamada | G06K 9/48 | 382/197 |
| 5,577,166 A * | 11/1996 | Mizuno | G06K 9/6254 | 706/20 |
| 5,583,771 A * | 12/1996 | Lynch | B60R 21/0132 | 180/282 |
| 5,845,048 A * | 12/1998 | Masumoto | B25J 9/1697 | 706/20 |
| 5,960,125 A * | 9/1999 | Michael | G06T 7/80 | 382/151 |
| 5,978,521 A * | 11/1999 | Wallack | G01B 11/002 | 382/287 |
| 5,995,652 A * | 11/1999 | Chiu | G06K 9/6203 | 382/159 |
| 6,005,959 A * | 12/1999 | Mohan | G01B 11/024 | 348/89 |
| 6,031,930 A * | 2/2000 | Bacus | G01N 15/1475 | 382/133 |
| 6,141,033 A * | 10/2000 | Michael | G06K 9/38 | 348/25 |
| 6,233,365 B1 * | 5/2001 | Teruhiko | G06T 3/403 | 382/156 |
| 6,396,941 B1 * | 5/2002 | Bacus | G01N 1/312 | 382/128 |
| 6,421,458 B2 * | 7/2002 | Michael | G06K 9/00 | 382/151 |
| 6,546,137 B1 * | 4/2003 | Lai | G06K 9/6203 | 382/156 |
| 6,728,582 B1 * | 4/2004 | Wallack | G05B 19/41875 | 382/153 |
| 6,771,808 B1 * | 8/2004 | Wallack | G06K 9/3216 | 382/151 |
| 6,807,305 B2 * | 10/2004 | Rajagopal | G06F 17/15 | 382/209 |
| 6,920,180 B1 * | 7/2005 | Yamane | G06T 1/20 | 348/715 |
| 6,920,241 B1 * | 7/2005 | Dutta-Choudhury | G06T 7/001 | 348/125 |
| 6,944,331 B2 * | 9/2005 | Schmidt | G06T 7/001 | 382/165 |
| 7,158,677 B2 * | 1/2007 | Wenzel | G06K 9/6204 | 382/151 |
| 7,340,089 B2 * | 3/2008 | Nair | G06K 9/6282 | 382/159 |
| 7,421,097 B2 * | 9/2008 | Hamza | G06K 9/00288 | 235/382 |
| 7,903,883 B2 * | 3/2011 | Zitnick, III | G06K 9/6296 | 382/225 |
| 7,925,070 B2 * | 4/2011 | Sumida | G01N 15/1463 | 382/134 |
| 7,936,928 B2 * | 5/2011 | Wenzel | G06K 9/4609 | 382/203 |
| 7,982,779 B2 * | 7/2011 | Saeki | G01N 21/956 | 348/218.1 |
| 8,095,237 B2 * | 1/2012 | Habibi | B25J 9/1692 | 700/245 |
| 8,103,085 B1 * | 1/2012 | Zadeh | G06T 7/001 | 356/237.1 |
| 8,111,904 B2 * | 2/2012 | Wallack | G06K 9/209 | 382/152 |
| 8,184,912 B2 * | 5/2012 | Hayasaki | G06K 9/3216 | 382/181 |
| 8,380,342 B2 * | 2/2013 | Ban | B25J 9/1679 | 700/218 |
| 8,600,192 B2 * | 12/2013 | Liu | G06T 7/593 | 382/154 |
| 8,620,060 B2 * | 12/2013 | Takayama | G06K 9/6255 | 382/141 |
| 8,626,686 B1 * | 1/2014 | Rhodes | G06N 3/049 | 706/20 |
| 8,825,452 B2 * | 9/2014 | Shono | G06F 17/50 | 703/1 |
| 8,929,608 B2 * | 1/2015 | Takizawa | G06T 7/74 | 382/106 |
| 9,044,858 B2 * | 6/2015 | Ito | B25J 9/1612 | |
| 9,050,722 B2 * | 6/2015 | Satou | B25J 9/1679 | |
| 9,060,114 B2 * | 6/2015 | Takizawa | G06K 9/00201 | |
| 9,076,035 B2 * | 7/2015 | Tanaka | G06K 9/6254 | |
| 9,079,310 B2 * | 7/2015 | Kumiya | B25J 9/1697 | |
| 9,092,851 B2 * | 7/2015 | Marugame | G06T 7/0012 | |
| 9,124,873 B2 * | 9/2015 | Liu | G06K 9/209 | |
| 9,156,162 B2 * | 10/2015 | Suzuki | B25J 9/16 | |
| 9,177,375 B2 * | 11/2015 | Mizutani | G06F 19/321 | |
| 9,305,216 B1 * | 4/2016 | Mishra | G06F 16/50 | |
| 9,334,096 B2 * | 5/2016 | Luciano, Jr. | B65D 75/36 | |
| 9,346,166 B2 * | 5/2016 | Gotou | B25J 9/1697 | |
| 9,434,070 B2 * | 9/2016 | Satou | B25J 9/1612 | |
| 9,494,528 B2 * | 11/2016 | Matsuda | G01N 21/8806 | |
| 9,508,192 B2 * | 11/2016 | Minato | G06T 11/60 | |
| 9,524,442 B2 * | 12/2016 | Ijiri | G06K 9/00973 | |
| 9,529,945 B2 * | 12/2016 | Atohira | G06F 17/5009 | |
| 9,563,825 B2 * | 2/2017 | Shen | G06N 3/0454 | |
| 9,595,095 B2 * | 3/2017 | Aiso | G06T 7/73 | |
| 9,638,910 B2 * | 5/2017 | Oba | G02B 21/06 | |
| 9,643,796 B2 * | 5/2017 | Koga | B25J 9/1697 | |
| 9,684,940 B2 * | 6/2017 | Kimoto | G06T 1/00 | |
| 9,721,184 B2 * | 8/2017 | Yamazaki | B25J 9/1697 | |
| 9,767,564 B2 * | 9/2017 | Bostick | G06T 7/33 | |
| 9,769,428 B2 * | 9/2017 | Kanno | B25J 9/1697 | |
| 9,779,296 B1 * | 10/2017 | Ma | G06K 9/4671 | |
| 9,789,517 B2 * | 10/2017 | Doublet | B07C 5/34 | |
| 9,813,607 B2 * | 11/2017 | Kalevo | H04N 5/23212 | |
| 9,844,881 B2 * | 12/2017 | Payton | B25J 9/1697 | |
| 9,844,882 B2 * | 12/2017 | Takizawa | B25J 9/1694 | |
| 9,886,646 B2 * | 2/2018 | Fukui | G06K 9/6267 | |
| 9,892,344 B1 * | 2/2018 | Tran | G06K 9/66 | |
| 9,895,810 B2 * | 2/2018 | Nishi | B25J 9/1692 | |
| 9,898,846 B1 * | 2/2018 | Borras | G06K 9/00651 | |
| 9,930,248 B2 * | 3/2018 | Bayani | H04N 5/23216 | |
| 9,959,451 B2 * | 5/2018 | Suenaga | G06K 9/00208 | |
| 9,996,770 B2 * | 6/2018 | Ishii | G06T 7/001 | |
| 10,055,805 B2 * | 8/2018 | Satou | B25J 13/08 | |
| 10,096,103 B2 * | 10/2018 | Sagisaka | G01N 21/8851 | |
| 10,131,051 B1 * | 11/2018 | Goyal | B25J 9/1612 | |
| 10,140,773 B2 * | 11/2018 | Short | G06T 7/73 | |
| 10,176,382 B1 * | 1/2019 | Owechko | G06K 9/6289 | |
| 10,181,187 B2 * | 1/2019 | Kubo | G06T 7/0012 | |
| 10,184,789 B2 * | 1/2019 | Sasaki | G01B 11/2527 | |
| 10,187,593 B2 * | 1/2019 | Holmes | A61J 1/03 | |
| 10,190,873 B1 * | 1/2019 | Yamagami | G01B 11/02 | |
| 10,201,900 B2 * | 2/2019 | Ishige | B25J 9/1692 | |
| 10,203,666 B2 * | 2/2019 | Takahashi | G05B 13/0265 | |
| 10,232,512 B2 * | 3/2019 | Ooba | B25J 9/1697 | |
| 10,235,797 B1 * | 3/2019 | Sheffield | G06T 15/205 | |

(56) References Cited

U.S. PATENT DOCUMENTS

| | | | |
|---|---|---|---|
| 10,262,406 B2* | 4/2019 | Sakaguchi | B25J 9/1605 |
| 10,311,596 B2* | 6/2019 | Inazumi | B25J 9/1697 |
| 10,416,086 B2* | 9/2019 | Kido | G01B 11/303 |
| 10,424,058 B2* | 9/2019 | Sagisaka | H04N 1/00 |
| 10,425,560 B2* | 9/2019 | Kida | G06T 7/001 |
| 10,518,417 B2* | 12/2019 | Wada | B25J 9/1612 |
| 10,525,598 B2* | 1/2020 | Takahashi | B25J 9/1641 |
| 10,596,698 B2* | 3/2020 | Oota | B25J 9/161 |
| 10,603,797 B2* | 3/2020 | Ozaki | B25J 13/003 |
| 10,614,565 B2* | 4/2020 | Namiki | G06T 7/70 |
| 10,664,754 B2* | 5/2020 | Gotou | G06N 3/0454 |
| 10,664,767 B2* | 5/2020 | Takigawa | B23K 26/083 |
| 10,692,018 B2* | 6/2020 | Ooba | B25J 13/003 |
| 10,712,288 B2* | 7/2020 | Okajima | G01N 21/8806 |
| 10,717,196 B2* | 7/2020 | Yamazaki | B25J 9/1612 |
| 10,737,385 B2* | 8/2020 | Shibasaki | B25J 9/163 |
| 2001/0004089 A1* | 6/2001 | Gleis | G05B 19/4183 235/385 |
| 2001/0050999 A1* | 12/2001 | Bacus | G01N 15/1475 382/128 |
| 2002/0052877 A1* | 5/2002 | Okamoto | G06Q 10/08 |
| 2002/0102011 A1* | 8/2002 | Bacus | G06F 19/20 382/128 |
| 2002/0159641 A1* | 10/2002 | Whitney | G06K 9/6228 382/219 |
| 2002/0186882 A1* | 12/2002 | Cotman | G06K 9/00127 382/165 |
| 2003/0174891 A1* | 9/2003 | Wenzel | G06K 9/6857 382/209 |
| 2003/0194133 A1* | 10/2003 | Wenzel | G06K 9/48 382/209 |
| 2003/0198388 A1* | 10/2003 | Wenzel | G06K 9/6203 382/209 |
| 2003/0210262 A1* | 11/2003 | Gahm | G02B 21/367 715/732 |
| 2004/0037467 A1* | 2/2004 | Wenzel | G06K 9/6204 382/203 |
| 2004/0133291 A1* | 7/2004 | Nakayama | G06F 8/656 700/94 |
| 2004/0146195 A1* | 7/2004 | Fukagawa | H05K 13/0817 382/150 |
| 2004/0175764 A1* | 9/2004 | Nishiyama | G06T 1/00 435/7.2 |
| 2004/0184657 A1* | 9/2004 | Lin | G06T 3/4007 382/159 |
| 2004/0247181 A1* | 12/2004 | Wenzel | G06K 9/4609 382/206 |
| 2005/0111738 A1* | 5/2005 | Iizuka | G06K 9/4633 382/190 |
| 2005/0147287 A1* | 7/2005 | Sakai | G01N 21/9501 382/141 |
| 2005/0178949 A1* | 8/2005 | Saeki | G01N 21/9501 250/208.1 |
| 2005/0226489 A1* | 10/2005 | Beach | G06T 7/0004 382/141 |
| 2006/0002604 A1* | 1/2006 | Sakai | G06T 7/001 382/141 |
| 2006/0039601 A1* | 2/2006 | Nair | G06K 9/6282 382/159 |
| 2006/0088202 A1* | 4/2006 | Venkatachalam | G06F 5/30 382/152 |
| 2006/0161391 A1* | 7/2006 | Inaba | G06F 11/2257 702/183 |
| 2006/0203821 A1* | 9/2006 | Mizusawa | H04L 1/1829 370/392 |
| 2006/0268259 A1* | 11/2006 | Park | G06K 9/00577 356/71 |
| 2006/0285752 A1* | 12/2006 | Fujieda | G01B 11/24 382/199 |
| 2006/0291719 A1* | 12/2006 | Ikeda | G01B 11/0608 382/154 |
| 2007/0014467 A1* | 1/2007 | Bryll | G06K 9/4609 382/152 |
| 2007/0058054 A1* | 3/2007 | Kagayama | G01N 21/6458 348/231.99 |
| 2007/0076944 A1* | 4/2007 | Bryll | G06T 3/40 382/152 |
| 2007/0081714 A1* | 4/2007 | Wallack | G06K 9/209 382/152 |
| 2007/0120844 A1* | 5/2007 | Beikirch | G06K 9/6253 345/419 |
| 2007/0177787 A1* | 8/2007 | Maeda | G06K 9/00557 382/141 |
| 2007/0242856 A1* | 10/2007 | Suzuki | G06K 9/00275 382/103 |
| 2008/0069477 A1* | 3/2008 | Engels | G06K 9/6254 382/291 |
| 2008/0082213 A1* | 4/2008 | Ban | G06T 7/73 700/260 |
| 2008/0166053 A1* | 7/2008 | Furuhashi | G06F 16/58 382/190 |
| 2008/0216075 A1* | 9/2008 | Ogasawara | G06F 11/3688 718/100 |
| 2008/0219516 A1* | 9/2008 | Suzuki | G06K 9/00228 382/118 |
| 2008/0267499 A1* | 10/2008 | Deischinger | G06K 9/3233 382/173 |
| 2008/0281797 A1* | 11/2008 | Hori | G06F 16/5854 |
| 2008/0298672 A1* | 12/2008 | Wallack | G06K 9/32 382/154 |
| 2009/0033655 A1* | 2/2009 | Boca | B25J 9/1697 345/419 |
| 2009/0041340 A1* | 2/2009 | Suzuki | G06K 9/00288 382/159 |
| 2009/0060315 A1* | 3/2009 | Harris | G01N 21/951 382/141 |
| 2009/0154812 A1* | 6/2009 | Schmitt | G06K 9/4609 382/199 |
| 2009/0202139 A1* | 8/2009 | Toyoda | G06K 9/6255 382/145 |
| 2009/0208090 A1* | 8/2009 | Nishiura | G06K 9/6255 382/149 |
| 2009/0268076 A1* | 10/2009 | Kawamura | H04N 5/23293 348/333.12 |
| 2009/0291512 A1* | 11/2009 | Izuha | G06T 7/0004 438/16 |
| 2009/0306816 A1* | 12/2009 | Champel | B07C 5/34 700/223 |
| 2009/0316980 A1* | 12/2009 | Hanada | G06T 7/001 382/149 |
| 2010/0004778 A1* | 1/2010 | Arimatsu | B25J 9/1697 700/214 |
| 2010/0061602 A1* | 3/2010 | Yamada | G06K 9/00067 382/124 |
| 2010/0091362 A1* | 4/2010 | Isozaki | G02B 21/367 359/369 |
| 2010/0156896 A1* | 6/2010 | Ichimura | G01B 11/245 345/419 |
| 2010/0166294 A1* | 7/2010 | Marrion | G06K 9/00214 382/154 |
| 2010/0214936 A1* | 8/2010 | Ito | G06K 9/00986 370/252 |
| 2010/0223219 A1* | 9/2010 | Kato | G06N 3/08 706/27 |
| 2010/0224000 A1* | 9/2010 | Komatsu | G01N 29/46 73/602 |
| 2010/0226561 A1* | 9/2010 | Fujikawa | G06T 7/0002 382/141 |
| 2010/0226563 A1* | 9/2010 | Takayama | G06K 9/6255 382/154 |
| 2010/0238229 A1* | 9/2010 | Ito | B41J 29/38 347/19 |
| 2010/0239124 A1* | 9/2010 | Hazeyama | G06T 7/11 382/103 |
| 2010/0266208 A1* | 10/2010 | Downing | H04N 1/3872 382/195 |

(56) References Cited

U.S. PATENT DOCUMENTS

| | | | |
|---|---|---|---|
| 2010/0310043 A1* | 12/2010 | Shimada | G01N 23/06 378/57 |
| 2010/0322489 A1* | 12/2010 | Tizhoosh | G06K 9/6253 382/128 |
| 2011/0075123 A1* | 3/2011 | Nagamori | G03F 9/7073 355/72 |
| 2011/0090359 A1* | 4/2011 | Sagawa | G06K 9/3233 348/222.1 |
| 2011/0128367 A1* | 6/2011 | Yoshioka | G06T 1/00 348/79 |
| 2011/0182515 A1* | 7/2011 | Iwai | G06K 9/4676 382/190 |
| 2011/0182516 A1* | 7/2011 | Iwai | G06K 9/4671 382/190 |
| 2011/0188734 A1* | 8/2011 | Tsuchiya | G06T 7/0002 382/149 |
| 2011/0254764 A1* | 10/2011 | Kimoto | G02B 21/367 345/157 |
| 2011/0254861 A1* | 10/2011 | Emura | G06F 3/0488 345/633 |
| 2011/0262043 A1* | 10/2011 | Sato | G06K 9/00127 382/209 |
| 2011/0274362 A1* | 11/2011 | Isomae | G06K 9/6254 382/224 |
| 2012/0027286 A1* | 2/2012 | Xu | G01N 21/95 382/149 |
| 2012/0027307 A1* | 2/2012 | Naruse | G01B 9/04 382/199 |
| 2012/0045115 A1* | 2/2012 | Dong | G01N 21/95607 382/149 |
| 2012/0070089 A1* | 3/2012 | Yamada | G06K 9/6255 382/209 |
| 2012/0131529 A1* | 5/2012 | Hayakawa | G01N 21/8851 716/112 |
| 2012/0188283 A1* | 7/2012 | Ohashi | G06K 9/6254 345/660 |
| 2012/0200596 A1* | 8/2012 | Gotou | B07C 5/38 345/625 |
| 2012/0201448 A1* | 8/2012 | Nammoto | G06T 7/0008 382/153 |
| 2012/0219188 A1* | 8/2012 | Kurz | G06K 9/00671 382/103 |
| 2012/0250544 A1* | 10/2012 | Sasaki | G05B 19/4186 370/252 |
| 2012/0296592 A1* | 11/2012 | Luciano, Jr. | B65D 75/36 702/84 |
| 2012/0301860 A1* | 11/2012 | Yamashita | G09B 5/00 434/350 |
| 2012/0320094 A1* | 12/2012 | Ruddle | G02B 21/367 345/660 |
| 2013/0010137 A1* | 1/2013 | Kawai | H04N 5/23258 348/208.1 |
| 2013/0038901 A1* | 2/2013 | Shimadu | H04N 1/0022 358/1.15 |
| 2013/0114898 A1* | 5/2013 | Taguchi | G01B 11/00 382/170 |
| 2013/0116900 A1* | 5/2013 | Yuyama | F16H 59/72 701/58 |
| 2013/0135463 A1* | 5/2013 | Aratani | G06K 9/4652 348/135 |
| 2013/0163887 A1* | 6/2013 | Nakano | G06K 9/6254 382/224 |
| 2013/0170732 A1* | 7/2013 | Gotou | G06T 7/0012 382/141 |
| 2013/0177232 A1* | 7/2013 | Hirano | G06T 7/0004 382/141 |
| 2013/0177250 A1* | 7/2013 | Yamamoto | G06T 7/0004 382/195 |
| 2013/0187954 A1* | 7/2013 | Saito | G06T 11/60 345/634 |
| 2013/0188038 A1* | 7/2013 | Tanimoto | A61J 3/06 348/86 |
| 2013/0238124 A1* | 9/2013 | Suzuki | B25J 9/16 700/250 |
| 2013/0245828 A1* | 9/2013 | Tateno | B25J 9/1697 700/259 |
| 2013/0249952 A1* | 9/2013 | Kusakabe | G06T 3/40 345/671 |
| 2013/0251266 A1* | 9/2013 | Nakagome | G06K 9/00657 382/195 |
| 2013/0301900 A1* | 11/2013 | Kiyuna | G06F 19/321 382/133 |
| 2013/0315456 A1* | 11/2013 | Marugame | G06T 7/0012 382/128 |
| 2013/0322737 A1* | 12/2013 | Murakami | G06T 7/001 382/149 |
| 2013/0342676 A1* | 12/2013 | Amano | H04N 7/18 348/86 |
| 2014/0078498 A1* | 3/2014 | Ikushima | G01N 21/88 356/237.1 |
| 2014/0091522 A1* | 4/2014 | Kelly | A63F 1/12 273/149 R |
| 2014/0098229 A1* | 4/2014 | Lu | H04N 7/181 348/148 |
| 2014/0099017 A1* | 4/2014 | Tsai | G06T 17/00 382/154 |
| 2014/0152794 A1* | 6/2014 | Takahashi | G01B 11/24 348/79 |
| 2014/0168259 A1* | 6/2014 | Yamaguchi | G06Q 30/02 345/632 |
| 2014/0219504 A1* | 8/2014 | Haraguchi | G06K 9/00369 382/103 |
| 2014/0233807 A1* | 8/2014 | Ejima | G06K 9/4633 382/106 |
| 2014/0236349 A1* | 8/2014 | Bae | G06F 19/3462 700/236 |
| 2014/0240488 A1* | 8/2014 | Kanou | G01N 21/8803 348/125 |
| 2014/0241623 A1* | 8/2014 | Wang | G06K 9/6257 382/160 |
| 2014/0285825 A1* | 9/2014 | Matsumoto | H04N 1/047 358/1.5 |
| 2014/0286565 A1* | 9/2014 | Ikenaga | G06K 9/6254 382/152 |
| 2014/0292813 A1* | 10/2014 | Takayama | G02B 21/367 345/634 |
| 2014/0292814 A1* | 10/2014 | Tsujimoto | G06T 11/60 345/636 |
| 2014/0294292 A1* | 10/2014 | Aoba | G06T 7/75 382/159 |
| 2014/0301632 A1* | 10/2014 | Ikeda | G06T 7/0004 382/152 |
| 2014/0301634 A1* | 10/2014 | Ishii | G06K 9/6215 382/155 |
| 2014/0301648 A1* | 10/2014 | Kato | G06T 7/344 382/199 |
| 2014/0306992 A1* | 10/2014 | Tsujimoto | G06F 19/321 345/632 |
| 2014/0314300 A1* | 10/2014 | Kaufman | G06K 9/00127 382/133 |
| 2014/0314302 A1* | 10/2014 | Minato | G06T 7/0004 382/141 |
| 2014/0327687 A1* | 11/2014 | Murakami | G06F 3/14 345/545 |
| 2014/0339374 A1* | 11/2014 | Mian | G08G 1/0175 246/473.1 |
| 2015/0003678 A1* | 1/2015 | Watanabe | B25J 9/1697 382/103 |
| 2015/0054855 A1* | 2/2015 | Sato | G06F 3/04845 345/661 |
| 2015/0055823 A1* | 2/2015 | Kotake | G01N 21/956 382/103 |
| 2015/0062381 A1* | 3/2015 | Na | H04N 5/23293 348/239 |
| 2015/0160650 A1* | 6/2015 | Scelsi | G05B 19/41805 700/99 |
| 2015/0186422 A1* | 7/2015 | Sumitomo | G06K 9/6202 382/218 |

(56) References Cited

U.S. PATENT DOCUMENTS

| | | | |
|---|---|---|---|
| 2015/0186753 A1* | 7/2015 | Horita | G06T 7/001 382/103 |
| 2015/0213328 A1* | 7/2015 | Mase | G06K 9/4642 382/201 |
| 2015/0262012 A1* | 9/2015 | Kim | G06K 9/3241 382/103 |
| 2015/0262414 A1* | 9/2015 | Minato | G06T 11/60 345/420 |
| 2015/0294189 A1* | 10/2015 | Benhimane | G06K 9/623 382/195 |
| 2015/0345936 A1* | 12/2015 | Sumitomo | G06T 7/001 348/135 |
| 2015/0355103 A1* | 12/2015 | Ando | G01N 21/8851 348/46 |
| 2015/0355104 A1* | 12/2015 | Matsuda | G01N 21/8806 356/237.2 |
| 2015/0356710 A1* | 12/2015 | Kunze | G06T 3/4007 348/91 |
| 2015/0358602 A1* | 12/2015 | Mayumi | G01N 21/8806 348/46 |
| 2016/0001445 A1* | 1/2016 | Setsuda | B25J 9/1679 700/260 |
| 2016/0005156 A1* | 1/2016 | Wang | H04N 5/23293 348/94 |
| 2016/0005161 A1* | 1/2016 | Aiso | G06T 7/73 382/153 |
| 2016/0012277 A1* | 1/2016 | Tate | G06K 9/6227 382/159 |
| 2016/0019706 A1* | 1/2016 | Otomaru | G06T 7/73 345/634 |
| 2016/0021306 A1* | 1/2016 | Cho | G01B 21/04 348/135 |
| 2016/0025781 A1* | 1/2016 | Kumeta | H05K 7/20745 702/182 |
| 2016/0059419 A1* | 3/2016 | Suzuki | B25J 9/1697 700/114 |
| 2016/0065861 A1* | 3/2016 | Steinberg | G06K 9/00228 348/239 |
| 2016/0070985 A1* | 3/2016 | Sashida | G06K 9/6255 382/209 |
| 2016/0104046 A1* | 4/2016 | Doettling | F16M 11/105 382/103 |
| 2016/0114925 A1* | 4/2016 | Yuyama | G06T 7/0004 382/141 |
| 2016/0203593 A1 | 7/2016 | Henkemeyer et al. | |
| 2016/0229445 A1* | 8/2016 | Sasaki | B62D 5/0484 |
| 2016/0234429 A1* | 8/2016 | Cho | G06T 1/0014 |
| 2016/0253468 A1* | 9/2016 | Osawa | G16H 50/20 600/407 |
| 2016/0295171 A1* | 10/2016 | Van Den Brink | H04N 7/181 |
| 2016/0301903 A1* | 10/2016 | Gamada | H04N 9/3164 |
| 2016/0321511 A1* | 11/2016 | Abhau | G06K 9/00818 |
| 2016/0357406 A1* | 12/2016 | Lee | G06T 11/60 |
| 2016/0370791 A1* | 12/2016 | Revanur | B33Y 50/02 |
| 2017/0004385 A1* | 1/2017 | Aoba | G06K 9/00208 |
| 2017/0004386 A1* | 1/2017 | Palacio | G06K 9/325 |
| 2017/0017862 A1* | 1/2017 | Konishi | G06K 9/6202 |
| 2017/0018116 A1* | 1/2017 | Sun | G06T 7/12 |
| 2017/0032177 A1* | 2/2017 | Suenaga | G06K 9/00208 |
| 2017/0046841 A1* | 2/2017 | Bostick | G06T 7/0042 |
| 2017/0061253 A1* | 3/2017 | Burgos | G06T 7/70 |
| 2017/0069077 A1* | 3/2017 | Zhang | G06K 9/52 |
| 2017/0076468 A1* | 3/2017 | Krauss | G06T 7/80 |
| 2017/0092015 A1* | 3/2017 | McCann | G06T 17/00 |
| 2017/0099200 A1* | 4/2017 | Ellenbogen | H04L 43/04 |
| 2017/0103124 A1* | 4/2017 | Hassan | G06F 17/30675 |
| 2017/0106540 A1* | 4/2017 | Watanabe | G06K 9/00214 |
| 2017/0116743 A1* | 4/2017 | Matsumoto | G06K 9/00805 |
| 2017/0132451 A1* | 5/2017 | Namiki | G06K 9/6254 |
| 2017/0140091 A1* | 5/2017 | Okuno | G06F 30/23 |
| 2017/0140521 A1* | 5/2017 | Sakaguchi | B25J 9/1605 |
| 2017/0142340 A1* | 5/2017 | Kishi | H04N 5/23293 |
| 2017/0148153 A1* | 5/2017 | Nakao | G06T 7/0004 |
| 2017/0148154 A1* | 5/2017 | Nakao | G06T 7/0004 |
| 2017/0169276 A1* | 6/2017 | Agaian | G16H 50/30 |
| 2017/0193296 A1* | 7/2017 | Duong | G06K 9/00335 |
| 2017/0206676 A1* | 7/2017 | Nakazato | G06T 7/73 |
| 2017/0236262 A1* | 8/2017 | Ohnuki | G06T 7/74 700/30 |
| 2017/0243077 A1* | 8/2017 | Fukui | G06K 9/4671 |
| 2017/0249766 A1* | 8/2017 | Namiki | G06K 9/6255 |
| 2017/0252924 A1* | 9/2017 | Vijayanarasimhan | G06N 3/008 |
| 2017/0256081 A1* | 9/2017 | Ohki | G06T 11/60 |
| 2017/0274534 A1* | 9/2017 | Takahashi | B25J 19/023 |
| 2017/0286810 A1* | 10/2017 | Shigenaka | G06K 9/628 |
| 2017/0304732 A1* | 10/2017 | Velic | G06K 9/00201 |
| 2017/0305589 A1* | 10/2017 | Yuyama | A61J 3/00 |
| 2017/0343989 A1* | 11/2017 | Itakura | G05B 19/4155 |
| 2017/0346996 A1* | 11/2017 | Kida | G06T 7/74 |
| 2017/0351904 A1* | 12/2017 | Kyusojin | G06F 19/321 |
| 2017/0352145 A1* | 12/2017 | Dhagat | G02B 21/002 |
| 2017/0355078 A1* | 12/2017 | Ur | B25J 9/1612 |
| 2017/0358069 A1* | 12/2017 | Sagisaka | G06T 7/001 |
| 2017/0358070 A1* | 12/2017 | Sagisaka | H04N 5/232935 |
| 2017/0358071 A1* | 12/2017 | Yamaoka | H04N 5/23293 |
| 2017/0372526 A1* | 12/2017 | Groten | G06T 19/006 |
| 2018/0004806 A1* | 1/2018 | Ohashi | G06K 9/6215 |
| 2018/0005424 A1* | 1/2018 | Niinuma | G06T 19/006 |
| 2018/0013950 A1* | 1/2018 | Steinberg | H04N 5/23229 |
| 2018/0025252 A1* | 1/2018 | Konishi | G06K 9/4609 382/216 |
| 2018/0046759 A1* | 2/2018 | Barral | G06F 19/321 |
| 2018/0047208 A1* | 2/2018 | Marin | H04N 13/243 |
| 2018/0068168 A1* | 3/2018 | Miyakoshi | G06K 9/6254 |
| 2018/0068480 A1* | 3/2018 | Cincotti | H04N 1/00278 |
| 2018/0089763 A1* | 3/2018 | Okazaki | G06Q 40/08 |
| 2018/0096244 A1* | 4/2018 | Mallinson | H04N 13/366 |
| 2018/0099408 A1* | 4/2018 | Shibata | B25J 9/1697 |
| 2018/0121721 A1* | 5/2018 | Garcia | G06K 9/00536 |
| 2018/0137689 A1* | 5/2018 | Eastwood | G06T 19/20 |
| 2018/0150899 A1* | 5/2018 | Waldron | G06Q 30/0633 |
| 2018/0197311 A1* | 7/2018 | Takizawa | B25J 9/1697 |
| 2018/0211373 A1* | 7/2018 | Stoppa | G06K 9/4628 |
| 2018/0250822 A1* | 9/2018 | Shimodaira | B25J 9/1671 |
| 2018/0250823 A1* | 9/2018 | Shimodaira | B25J 9/1671 |
| 2018/0250826 A1* | 9/2018 | Jiang | B25J 9/1697 |
| 2018/0252647 A1* | 9/2018 | Levitz | G01N 21/21 |
| 2018/0260628 A1* | 9/2018 | Namiki | G06N 3/088 |
| 2018/0260661 A1* | 9/2018 | Konishi | G06K 9/6255 |
| 2018/0268257 A1* | 9/2018 | Ren | G06K 9/6256 |
| 2018/0285698 A1* | 10/2018 | Yamada | G06K 9/6267 |
| 2018/0314877 A1* | 11/2018 | Srivastava | G06T 7/55 |
| 2018/0322623 A1* | 11/2018 | Memo | G06N 3/084 |
| 2018/0328789 A1* | 11/2018 | Kido | G01J 3/462 |
| 2018/0330489 A1* | 11/2018 | Kido | G06T 7/0004 |
| 2018/0330490 A1* | 11/2018 | Kido | G06T 7/0004 |
| 2018/0336407 A1* | 11/2018 | Namiki | G06N 20/00 |
| 2018/0336479 A1* | 11/2018 | Guttmann | G06T 7/97 |
| 2018/0342077 A1* | 11/2018 | Tsuno | G06K 9/6256 |
| 2018/0345485 A1* | 12/2018 | Sinnet | G06T 7/73 |
| 2018/0348144 A1* | 12/2018 | Ando | G01B 11/2522 |
| 2018/0350060 A1* | 12/2018 | Nakao | G06K 9/48 |
| 2018/0357519 A1* | 12/2018 | Jin | G06K 9/6282 |
| 2018/0361589 A1* | 12/2018 | Paquin | B25J 9/1697 |
| 2018/0370027 A1* | 12/2018 | Oota | B25J 9/1612 |
| 2019/0005600 A1* | 1/2019 | Hazeyama | B23Q 3/18 |
| 2019/0012579 A1* | 1/2019 | Namiki | G06T 7/0002 |
| 2019/0019045 A1* | 1/2019 | Ogura | G06T 7/74 |
| 2019/0026917 A1* | 1/2019 | Liao | G06T 7/73 |
| 2019/0034762 A1* | 1/2019 | Hashimoto | G06K 9/6256 |
| 2019/0035067 A1* | 1/2019 | Yamamoto | H04N 21/4335 |
| 2019/0042896 A1* | 2/2019 | Sabripour | G06K 9/66 |
| 2019/0058887 A1* | 2/2019 | Wang | H04N 19/17 |
| 2019/0061151 A1* | 2/2019 | Namiki | B65G 57/00 |
| 2019/0065823 A1* | 2/2019 | Srivastava | G06K 9/00214 |
| 2019/0065901 A1* | 2/2019 | Amato | G06K 9/6218 |
| 2019/0066333 A1* | 2/2019 | Furihata | G06K 9/00664 |
| 2019/0077015 A1* | 3/2019 | Shibasaki | B25J 9/163 |
| 2019/0080468 A1* | 3/2019 | Tsai | G06T 7/73 |
| 2019/0084011 A1* | 3/2019 | Imai | B07C 5/3427 |
| 2019/0087942 A1* | 3/2019 | Ma | G06K 9/00463 |

(56) References Cited

U.S. PATENT DOCUMENTS

| | | | |
|---|---|---|---|
| 2019/0095749 A1* | 3/2019 | Konishi | G06K 9/6202 |
| 2019/0095763 A1* | 3/2019 | Arilla | G06Q 30/02 |
| 2019/0096055 A1* | 3/2019 | Namiki | B25J 9/1664 |
| 2019/0096083 A1* | 3/2019 | Arano | G06T 1/60 |
| 2019/0096135 A1* | 3/2019 | Dal Mutto | G06T 17/20 |
| 2019/0099142 A1* | 4/2019 | Sato | H05G 1/66 |
| 2019/0108159 A1* | 4/2019 | Donahue | G06N 3/08 |
| 2019/0108396 A1* | 4/2019 | Dal Mutto | G06K 9/00664 |
| 2019/0112134 A1* | 4/2019 | Ooba | G05B 19/4182 |
| 2019/0114804 A1* | 4/2019 | Sundaresan | G06T 7/74 |
| 2019/0114941 A1* | 4/2019 | Shimaoka | G09B 19/003 |
| 2019/0116049 A1* | 4/2019 | Ittogi | H04L 9/0861 |
| 2019/0122173 A1* | 4/2019 | Souder | G06K 9/00771 |
| 2019/0126467 A1* | 5/2019 | Kawamoto | B25J 13/08 |
| 2019/0130555 A1* | 5/2019 | Chang | G06K 9/627 |
| 2019/0130560 A1* | 5/2019 | Horowitz | G06T 7/0008 |
| 2019/0137410 A1* | 5/2019 | Valkonen | G06T 7/0004 |
| 2019/0138786 A1* | 5/2019 | Trenholm | G06K 9/00208 |
| 2019/0139212 A1* | 5/2019 | Hanzawa | G06T 7/0002 |
| 2019/0139213 A1* | 5/2019 | Kurita | G06N 20/00 |
| 2019/0147305 A1* | 5/2019 | Lu | G06K 9/72 |
| 2019/0147586 A1* | 5/2019 | Ikeda | G06K 9/4628 382/157 |
| 2019/0156474 A1* | 5/2019 | Watanabe | G06T 7/001 |
| 2019/0164047 A1* | 5/2019 | ter Haar Romenij | G06F 17/16 |
| 2019/0171914 A1* | 6/2019 | Zlotnick | G06K 9/66 |
| 2019/0171915 A1* | 6/2019 | Reicher | G06F 3/04842 |
| 2019/0188451 A1* | 6/2019 | D'Ercoli | G06K 9/00208 |
| 2019/0188840 A1* | 6/2019 | Kwon | G06T 7/001 |
| 2019/0188845 A1* | 6/2019 | Tamai | G06K 9/00624 |
| 2019/0188846 A1* | 6/2019 | Tamai | G06F 17/18 |
| 2019/0188866 A1* | 6/2019 | Mehrseresht | G06T 7/248 |
| 2019/0206084 A1* | 7/2019 | Noble | H04N 5/247 |
| 2019/0220966 A1* | 7/2019 | Nakamura | G01N 21/8851 |
| 2019/0251349 A1* | 8/2019 | Duerksen | G06T 7/0002 |
| 2019/0270200 A1* | 9/2019 | Sakai | B25J 9/1697 |
| 2019/0286946 A1* | 9/2019 | Uemura | G06K 9/6255 |
| 2019/0287235 A1* | 9/2019 | Ikeda | G06T 7/0008 |
| 2019/0295244 A1* | 9/2019 | Adachi | G06K 9/6271 |
| 2019/0299405 A1* | 10/2019 | Warashina | B25J 9/1697 |
| 2019/0308325 A1* | 10/2019 | Higo | G06T 7/70 |
| 2019/0311470 A1* | 10/2019 | Lee | G06N 20/00 |
| 2019/0334897 A1* | 10/2019 | Anzai | H04L 12/40 |
| 2019/0337152 A1* | 11/2019 | Homberg | G06K 9/00664 |
| 2019/0362480 A1* | 11/2019 | Diao | G06K 9/6206 |
| 2019/0362486 A1* | 11/2019 | Diao | G06K 9/6256 |
| 2019/0378242 A1* | 12/2019 | Zhang | G06T 3/4061 |
| 2019/0378259 A1* | 12/2019 | Hayashi | H04N 5/225 |
| 2020/0005421 A1* | 1/2020 | Sato | G06T 7/00 |
| 2020/0005422 A1* | 1/2020 | Subramanian | G06T 1/0014 |
| 2020/0013190 A1* | 1/2020 | Li | G06K 9/6202 |
| 2020/0019807 A1* | 1/2020 | Ma | G06K 9/6215 |
| 2020/0047337 A1* | 2/2020 | Williams | B25J 9/163 |
| 2020/0058161 A1* | 2/2020 | Remine | G06T 7/001 |
| 2020/0074666 A1* | 3/2020 | Yamamoto | H04N 7/183 |
| 2020/0075141 A1* | 3/2020 | Iwamura | G16H 10/20 |
| 2020/0082524 A1* | 3/2020 | Hiraoka | G06T 7/001 |
| 2020/0104993 A1* | 4/2020 | Hong, II | G01N 21/8422 |
| 2020/0125887 A1* | 4/2020 | Nishii | G06K 9/4661 |
| 2020/0125889 A1* | 4/2020 | Okamoto | G06K 9/626 |
| 2020/0125894 A1* | 4/2020 | Maeda | G06K 9/00147 |
| 2020/0126204 A1* | 4/2020 | Watanabe | G06T 7/001 |
| 2020/0134377 A1* | 4/2020 | Attorre | G06K 9/6202 |
| 2020/0146635 A1* | 5/2020 | Wang | A61B 8/5261 |
| 2020/0147805 A1* | 5/2020 | Takahashi | B25J 9/1697 |
| 2020/0149871 A1* | 5/2020 | Kohlmann | G06T 3/608 |
| 2020/0156254 A1* | 5/2020 | Li | G06K 9/3241 |
| 2020/0167905 A1* | 5/2020 | Bian | G01N 21/8851 |
| 2020/0186533 A1* | 6/2020 | Takagi | H04L 63/101 |
| 2020/0193623 A1* | 6/2020 | Liu | G06T 7/73 |
| 2020/0210688 A1* | 7/2020 | Xu | G06K 9/00281 |
| 2020/0250801 A1* | 8/2020 | He | G06T 7/001 |
| 2020/0279359 A1* | 9/2020 | Kimura | G06T 1/20 |
| 2020/0311490 A1* | 10/2020 | Lee | A61B 6/5258 |
| 2020/0320748 A1* | 10/2020 | Levinshtein | G06K 9/6267 |

FOREIGN PATENT DOCUMENTS

| | | |
|---|---|---|
| EP | 2796918 A2 | 10/2014 |
| JP | 11067853 A | 3/1999 |
| JP | 2002071574 A | 3/2002 |
| JP | 2007-114843 A | 5/2007 |
| JP | 2010085145 A | 4/2010 |
| JP | 2012122730 A | 6/2012 |
| JP | 2013-142558 A | 7/2013 |
| JP | 2013148361 A | 8/2013 |
| JP | 2014044268 A | 3/2014 |
| WO | WO 2001/041068 A1 | 6/2001 |
| WO | 2013145202 A1 | 10/2013 |
| WO | 2015036261 A1 | 3/2015 |

OTHER PUBLICATIONS

"Generalizing the Hough Transform to Detect Arbitrary Shapes", D.H. Ballard, Pattern Recognition, vol. 13, No. 2, pp. 111-122, 1981.

"Random sample consensus: a paradigm for model fitting with applications to image analysis and automated cartography", Martin A. Fischler, et al., Communications of the Association for Computing Machinery vol. 24 No. 6, pp. 381-395, Jun. 1981.

Luh, T.C., "Character Recognition Example (III): Training a Simple NN for classification, Jul. 7, 2008," 12 pages.

"Image Segmentation Tutorial," Apr. 3, 2015, 20 pages.

* cited by examiner

|  | POSITION | POSTURE |
|---|---|---|
| FEATURE POINT P_1 | (tx_P1, ty_P1) | (vx_P1, vy_P1) |
| FEATURE POINT P_2 | (tx_P2, ty_P2) | (vx_P2, vy_P2) |
| : |  |  |
| FEATURE POINT P_NP | (tx_PNP, ty_PNP) | (vx_PNP, vy_PNP) |

IMAGE PROCESSING DEVICE FOR DISPLAYING OBJECT DETECTED FROM INPUT PICTURE IMAGE

BACKGROUND OF THE INVENTION

1. Field of the Invention

The present invention relates to an image processing device for displaying an object detected from an input picture image, and more particularly, relates to an image processing device for detecting positions of images of multiple objects shown in a picture image, and displaying a detection result in order to allow an operator to check whether the image of the detected object is correct.

2. Description of the Related Art

When an image of a particular object is detected from a picture image in a visual field of an image-capturing apparatus by using an image processing device, in general, feature values are compared between a reference information indicating an object (which is generally referred to as a model pattern, a template, or the like) and an input picture image obtained by the image-capturing apparatus, and when the degree of match is more than a designated level (threshold value), the object is determined to have been successfully detected.

However, even when the degree of match is more than the threshold value, the image of the object is not necessarily correctly detected in reality. Therefore, in order to adjust a detection parameter such as a threshold value for the degree of match, an operator may visually check whether the object is correctly detected or not. In order to check whether an object is correctly detected or not, a method of plotting an origin of the model pattern, a rectangle enclosing the model pattern, and a shape of the model pattern at the detected position on the input picture image is often employed.

Further, not only when the object is detected from the input picture image but also when the object in the input picture image is inspected, it is necessary for the operator to visually check whether a result of the correctness and incorrectness determination is appropriate or not in the stage of the parameter adjustment. In this case, it is desired to display a determination result in an easy-to-understand manner by, e.g., attaching a color to a defect portion and enclosing an object, i.e., a defective piece, in a different color.

Machine learning for improving an object detection probability and statistical processing for improving a model pattern may be preferably performed on the basis of a detection result and a correctness and incorrectness determination result. In a technique called supervised learning of machine learning, input data and a label thereof (OK/NG or a type) are given. In order to perform supervised learning on the basis of a detection result and a correctness and incorrectness determination result, a check is performed to determine whether the detection result and the result of the correctness and incorrectness determination are correct or not, and when there is an incorrect result, the label is corrected with a button, a text box, and the like. In the statistical processing, processing is performed on the image of the object of the correct determination result, and a threshold value for determining correctness and incorrectness is calculated by using the determination result of the correctness and incorrectness. In this case, learning is considered to include machine learning and statistical processing.

Japanese Unexamined Patent Publication (Kokai) No. 2007-114843 describes a correctness and incorrectness determination for allowing an operator to input a correctness and incorrectness determination result and setting a threshold value for performing correctness and incorrectness determination with a picture image and the correctness and incorrectness determination result. Selection of a picture image is performed by selecting a picture image file name, and the correctness and incorrectness determination result cannot be checked unless images are opened one by one. A single correctness and incorrectness determination result is considered to be present for a picture image, and it is not expected to determine correctness and incorrectness of multiple objects in a picture image.

International Publication No. 2001/041068 describes a defect inspection system in which, when a parameter of defect extraction is changed, defect extraction is performed again on all the stored picture images, and the correctness and incorrectness determination as well as the thumbnail picture images are displayed as a list. When a defect determination is newly performed, portions determined to have multiple defects are shown on the picture image. In this state, in order to enlarge a region determined to be a defect and register the defect to a defect dictionary, it may be preferable to click a defect portion on the picture image. Therefore, multiple defects may not be enlarged and displayed at a time. In addition, it is troublesome to perform a work of registering a defect.

Japanese Unexamined Patent Publication (Kokai) No. 2013-142558 describes an external appearance inspection apparatus in which, when a picture image, which is to be a non-defective piece, is newly added to a picture image group with which correctness and incorrectness are configured, the external appearance inspection apparatus calculates a threshold value for determination using the picture image group of the non-defective piece, and checks whether the defective piece is determined to be a defective piece with the threshold value. In this patent application, picture images are displayed one by one to allow correction of correctness and incorrectness, but it is not easy to check correctness and incorrectness for many picture images. Determination for multiple portions in a single picture image is not taken into consideration.

As explained above, when a detection result and a correctness and incorrectness determination result are checked, a method of plotting the detection result and the correctness and incorrectness determination result on a picture image is often employed.

However, this method involves the following problems.
  When multiple objects are detected from a single picture image, it is difficult to check the validity if the detection results are overlapping or adjacent to each other. Further, correcting a label causes correspondence between a button, a check box, and the like, which are to be corrected, and the detection result to be difficult to understand.
  When the size of the detection result for a picture image is small, it is difficult to check the validity.

SUMMARY OF INVENTION

It is an object of the invention to provide an image processing device for displaying an object detected from an input picture image in such a manner that a detection result and a correctness and incorrectness determination result can checked easily.

An image processing device includes an object detection unit for detecting one or more images of objects from an input picture image in which the objects have been captured, on the basis of a model pattern of the object, and a detection result display unit for graphically superimposing and displaying a detection result on each image thus detected. The detection result display unit includes a first frame for displaying the entire input picture image, and a second frame for listing and displaying one or more partial picture images each including an image detected from the input picture image. On the input picture image displayed in the first frame, detection results of all the detected images are superimposed and displayed, and on the partial picture image displayed in the second frame, a detection result of an image corresponding to each partial picture image is superimposed and displayed.

BRIEF DESCRIPTION OF THE DRAWINGS

The present invention will be understood more clearly by referring to the following accompanying drawings.

DETAILED DESCRIPTION

An image processing device for displaying an object detected from an input picture image will be described below with reference to the drawings. However, it should be understood that the invention is not limited to the drawings or embodiments described below.

In the following explanation in the embodiments, the following reference symbols are used as follows. In order to clarify the explanation, the reference symbols will be explained first.

NP: the number of feature points constituting a model pattern

P_i: the i-th feature point of the model pattern (i is 1 to NP)

NI: the number of input picture images

I_j: the j-th input picture image (j is 1 to NI)

NT_j: the number of images of objects detected from the j-th input picture image I_j T_jg: an image of the g-th object detected from the j-th input picture image I_j (g is 1 to NT_j)

Figure 1:
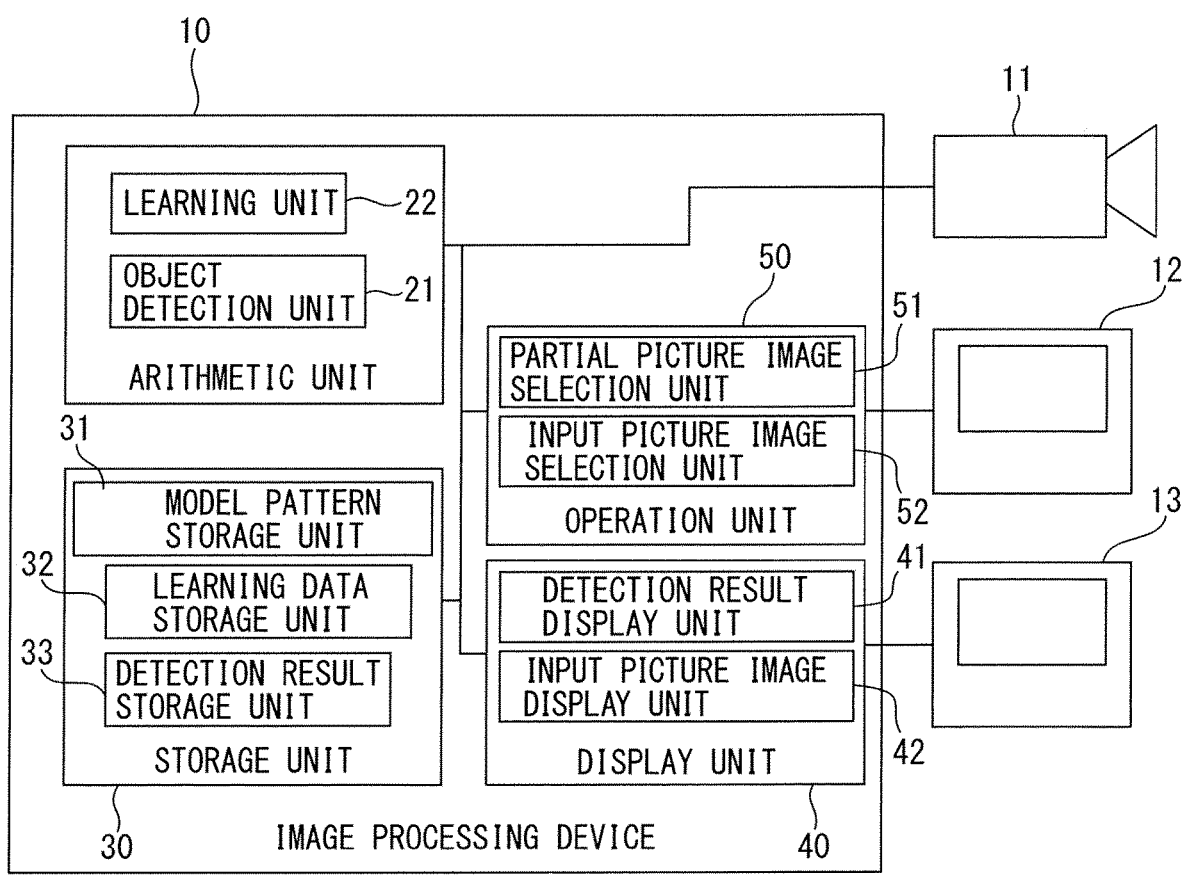
FIG. 1 is a block diagram illustrating a configuration of an image processing device according to a first embodiment.

L1_jg: first label of the image of the g-th object detected from the j-th input picture image I_j L2_j: second label of the j-th input picture image I_j FIG. 1 is a block diagram illustrating a configuration of an image processing device according to a first embodiment.

As illustrated in FIG. 1, an image processing device 10 according to the first embodiment 10 includes an arithmetic unit 20, a storage unit 30, a display unit 40, and an operation unit 50. The image processing device 10 is connected to a visual sensor 11, an operation board 12, a display apparatus 13, and the like. The arithmetic unit 20 includes an object detection unit 21 and a learning unit 22. The storage unit 30 includes a model pattern storage unit 31, a learning data storage unit 32, and a detection result storage unit 33. The display unit 40 includes a detection result display unit 41 and an input picture image display unit 42. The operation unit 50 includes a partial picture image selection unit 51 and an input picture image selection unit 52. Each portion included in the image processing device 10 is realized with software on a computer having CPU, ROM, RAM, and the like.

The visual sensor 11 is connected to the image processing device 10 with a communication cable. The visual sensor 11 provides captured picture image data to the image processing device 10. The operation board 12 is connected to the image processing device 10 with a communication cable. The operation board 12 is used to operate a screen displayed on the display apparatus 13. The display apparatus 13 is connected to the image processing device 10 with a communication cable. The display apparatus 13 displays a picture image captured by the visual sensor 11, a detection result, and the like. It should be noted that the visual sensor 11, the operation board 12, and the display apparatus 13 may be integrally provided in the image processing device 10.

The display apparatus 13 is a display device having a CRT, a liquid crystal panel, or the like. The operation board 12 may be a mouse and a keyboard, or may be a touch panel on the display apparatus 13.

Figure 2:
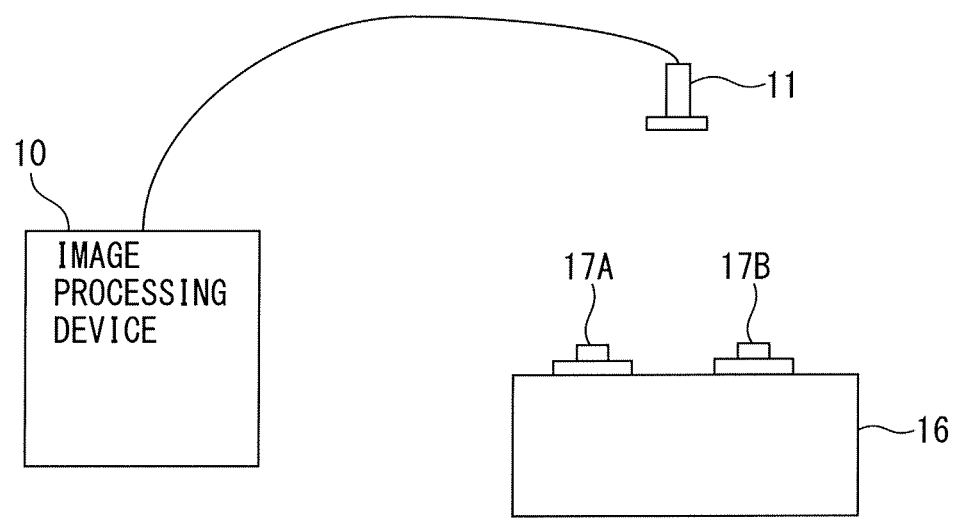
FIG. 2 is a diagram illustrating an example of a configuration in which the image processing device according to the first embodiment is employed.

FIG. 2 is a diagram illustrating an example of a configuration in which the image processing device 10 according to the first embodiment is employed.

As illustrated in FIG. 2, the visual sensor 11 is fixed and installed at a position so that the visual sensor 11 can capture picture images of the objects 17A and 17B, and the objects 17A and 17B are installed on a workbench 16. There may be a single object or multiple objects 17A and 17B placed on the workbench 16. The visual sensor 11 may be a camera for capturing grayscale picture images or color picture images, or may be a stereo camera or a three-dimensional sensor capable of obtaining range picture images.

In this first embodiment, it is assumed that a camera is used as the visual sensor 11, and the visual sensor 11 outputs a grayscale picture image in the explanation. The camera is an electronic camera having an imaging element such as a CCD (Charge Coupled Device), and is a well-known photodetector having a function of detecting a two-dimensional picture image on its image capturing plane (on a CCD array plane) by capturing an image. It should be noted that a two-dimensional coordinate system on an image capturing plane will be hereinafter referred to as an image coordinate system.

Figure 3:
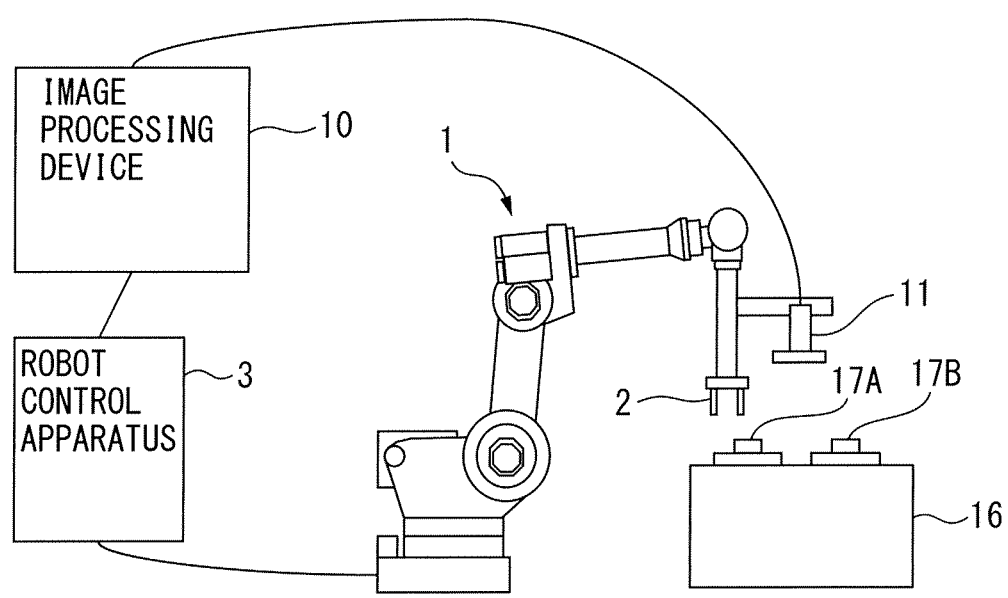
FIG. 3 is a diagram illustrating another example of a configuration in which the image processing device according to the first embodiment is employed.

FIG. 3 is a diagram illustrating another example of a configuration in which the image processing device 10 according to the first embodiment is employed.

As illustrated in FIG. 3, the visual sensor 11 may be installed on a movable portion such as a hand piece (hand) 2 of a robot 1. The objects 17A and 17B may be gripped by the hand piece of the robot 1 and may be moved so as to be placed within the visual field of the visual sensor installed and fixed. The robot 1 is connected with a communication cable to and controlled by a robot control apparatus 3. The robot control apparatus 3 uses the processing result given by the image processing device 10 to control the robot 1.

Figure 4:
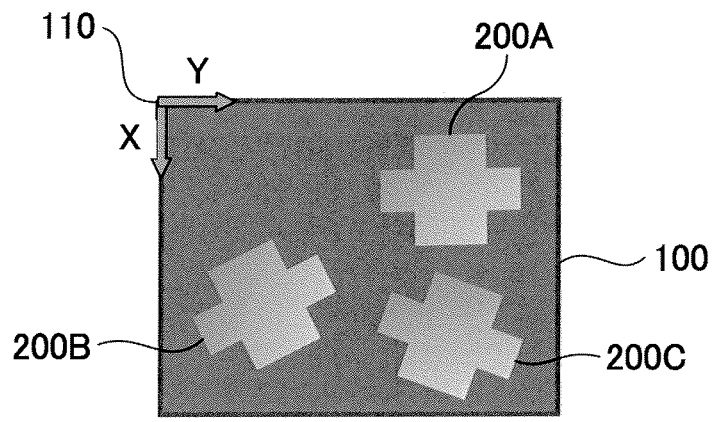
FIG. 4 is a diagram illustrating a relationship between a captured input picture image and a picture image coordinate system.

FIG. 4 is a diagram illustrating a relationship between a captured input picture image and a picture image coordinate system.

As illustrated in FIG. 4, the input picture image 100 includes a rectangular picture image plane, and has a picture image coordinate system 110 corresponding to the sides of the rectangle. A position on the picture image plane is represented by XY coordinates of the picture image coordinate system 110. In FIG. 4, the input picture image 100 includes picture images 200A to 200C of three objects. In the following explanation, a picture image of an object may be simply referred to as an object.

Figure 5:
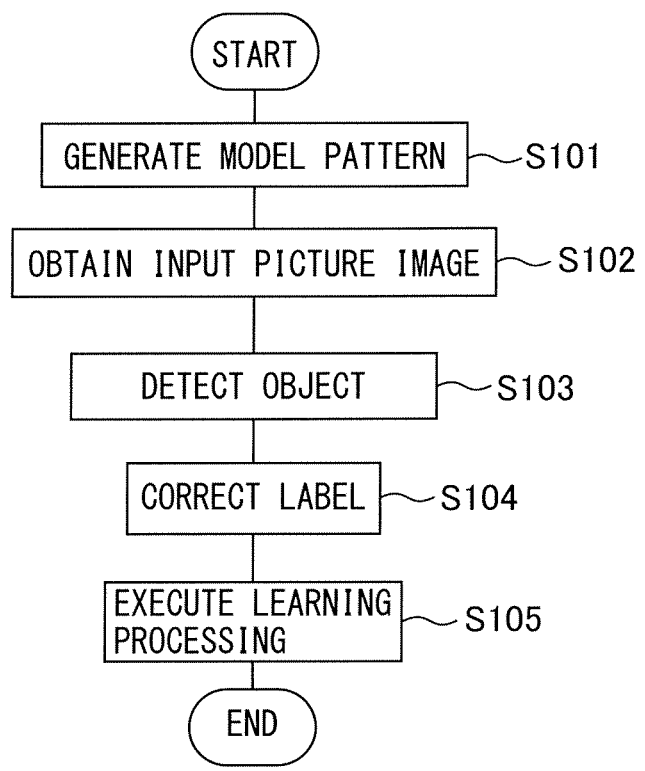
FIG. 5 is a flowchart illustrating a flow of processing of the image processing device according to the first embodiment.

FIG. 5 is a flowchart illustrating a flow of processing of the image processing device according to the first embodiment.

In accordance with the processing performed by the learning unit 22, the contents of the operation and processing performed by the operator with the image processing device are different. In this case, first, a case where the learning unit 22 performs statistical processing will be explained as an example.

In step S101, a model pattern used for detection of an object is generated.

The model pattern according to the first embodiment is constituted by multiple feature points. Various things can be used as the feature points, but in the first embodiment, an edge point is used as a feature point. The edge point is a point where a luminance gradient is high in a picture image, and can be used in order to obtain a contour shape of an object. A method for extracting an edge point is well-known. The edge point may be obtained with any granularity, but in this case, a single edge point is extracted for a single pixel.

The feature point is not limited to the edge point, and, for example, a feature point such as SIFT may be used. A method for extracting a SIFT feature point from a picture image is well known as described in "Object Recognition from Local Scale-Invariant Features", David G. Lowe, Proc. of the International Conference on Computer Vision, Corfu (September 1999) and the like.

The feature point includes at least a position. When a direction of a luminance gradient of an edge point is defined as a posture of the feature point, the position as well as the position posture of the feature point can be defined. In the first embodiment, the feature point is considered to have a position and a posture.

Figures 6, 7:
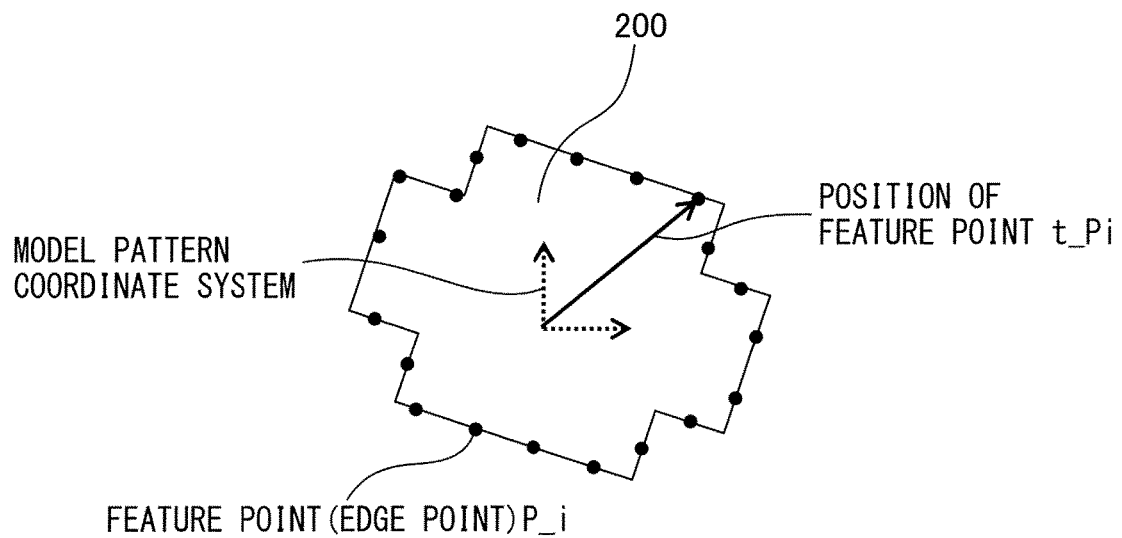
FIG. 6 is a diagram illustrating an example of a model pattern of an object.
FIG. 7 is a diagram illustrating an example of a format of data related to a model pattern.

FIG. 6 is a diagram illustrating an example of a model pattern of an object. As illustrated in FIG. 6, the model pattern of the 200 is constituted by multiple feature points (edge points) $P\_i$ ($i=1$ to NP). The position posture of the feature point $P\_i$ constituting the model pattern may be expressed in any format, but for example, there is a method in which a coordinate system is defined in a model pattern (hereinafter referred to as a model pattern coordinate system) and a position $t\_Pi$ ($1=1$ to NP) and a posture $v\_Pi$ ($i=1$ to NP) of a feature point constituting the model pattern are expressed by using a position vector, a direction vector, and the like which are seen from the model pattern coordinate system.

The origin of the model pattern coordinate system may be defined in any way. For example, any given point is selected from feature points constituting the model pattern, and that point may be defined as the origin, and the centroid of all the feature points constituting the model pattern may be defined as the origin.

The posture of the model pattern coordinate system (axial direction) may also be defined in any way. For example, in the picture image in which the model pattern is generated, the picture image coordinate system and the model pattern coordinate system may be defined to be in parallel, or any two points may be selected from the feature points constituting the model pattern and a direction extending from one of the two points to the other may be defined to be an X axis direction.

FIG. 7 is a diagram illustrating an example of a format of data about a model pattern.

As illustrated in FIG. 7, the data about the model pattern is expressed by the position and the posture with regard to each feature point. The feature point $P\_i$ constituting the model pattern is stored in the model pattern storage unit 31 in a format (position, posture) as illustrated in FIG. 7.

In step S102, one or more input picture images $I\_j$ ($j=1$ to NI) including an image of an object are obtained. The input picture image is obtained by arranging an object in the visual field of the visual sensor 11 and capturing a picture image. The picture image is preferably captured in the same environment as the actual production line. A large number of picture images of the object that are captured in the actual production line and saved may be used. Multiple objects may be shown in a single input picture image.

In step S103, the object detection unit 21 compares the model pattern with the input picture image $I\_j$ for each of the input picture images $I\_j$ ($j=1$ to NI), and performs detection of the object. The detection result is associated with the input picture image $I\_j$ and stored in the detection result storage unit 33. A result obtained from a series of processing up to execution of the following learning process is considered to be stored in the detection result storage unit 33. There are various methods for detecting an object with the object detection unit 21, but, for example, Generalized Hough Transform described in "Generalizing the Hough Transform to Detect Arbitrary Shapes", D. H. Ballard, Pattern Recognition Vol. 13, No. 2, pp. 111-122, 1981, RANSAC described in "Random sample consensus: a paradigm for model fitting with applications to picture image analysis and automated cartography", Martin A. Fischler, et al., Communications of the Association for Computing Machinery Vol. 24 No. 6 Pages 381-395, June 1981, and the like can be used as the well-known method. In the present embodiment, an image of an object of which degree of match is less than a threshold value but of which degree of match is within a previously determined range can also be added as a detection result. For example, when the degree of match is defined as 0 to 100, up to a degree of match obtained by subtracting 10 from the threshold value for the degree of match is tolerated. As described above, even with a detection result of which degree of match is less than the threshold value, a label can be changed as a correct detection result in a later step.

NT_j images of objects are assumed to have been detected from the input picture image I_j as a result of detection. The detected image is denoted as T_jg (g=1 to NT_j), and the detected position of the image T_jg is denoted as R_Tjg. The detected position R_Tjg is a position posture of the image T_jg of the object that is seen from the picture image coordinate system, i.e., a homogeneous transformation matrix representing a position posture of the model pattern coordinate system that is seen from the picture image coordinate system when the model pattern is superimposed on the image T_jg, and is expressed by the following equation.

$$R\_Tjg = \begin{bmatrix} a_{00} & a_{01} & a_{02} \\ a_{10} & a_{11} & a_{12} \\ 0 & 0 & 1 \end{bmatrix}$$

For example, when the object does not incline with respect to the optical axis of the camera, and only congruence transformation may be considered as a movement of an image of an object shown in a picture image, $a_{00}$ to $a_{12}$ are as follows.

$a_{00}$=cos θ
$a_{01}$=−sin θ
$a_{02}$=x
$a_{10}$=sin θ
$a_{11}$=cos θ
$a_{12}$=y However, (x, y) is a position on a picture image, and θ is a rotational movement amount on the picture image.

When the object does not incline with respect to the optical axis of the camera but the distance between the object and the camera is not constant, the size of the image of the object shown in the picture image changes in accordance with the distance, and therefore, the movement of the image of the object shown in the picture image is a similarity transformation. In this case, $a_{00}$ to $a_{12}$ are as follows.

$a_{00}$=s*cos θ
$a_{01}$=−s*sin θ
$a_{02}$=x
$a_{10}$=s*sin θ
$a_{11}$=s*cos θ
$a_{12}$=y However, s denotes a ratio between the size of the taught model pattern and the size of the image T_jg of the object.

The detected position R_Tjg and the input picture image I_j are made into a pair and stored in the detection result storage unit 33.

On the basis of the detected position R_Tjg of the image T_jg (j=1 to NI, g=1 to NT_j) of the object detected from each input picture image I_j (j=1 to NI), the position posture of the feature point P_i constituting the model pattern is transformed, and is superimposed on the image of the object on the picture image.

For the sake of explanation, the position posture of each feature point P_i constituting the model pattern is expressed by a homogeneous transformation matrix R_Pi. R_Pi can be described as follows.

$$R\_Pi = \begin{bmatrix} b_{00} & b_{01} & b_{02} \\ b_{10} & b_{11} & b_{12} \\ 0 & 0 & 1 \end{bmatrix}$$

$b_{00}$ = vx_Pi $b_{01}$ = −vy_Pi $b_{02}$ = tx_Pi $b_{10}$ = vy_Pi $b_{11}$ = vx_Pi $b_{12}$ = ty_Pi

However, t_Pi=(tx_Pi, ty_Pi) is the position of P_i in the model pattern coordinate system, and v_Pi (vx_Pi, vy_Pi) is the posture of P_i in the model pattern coordinate system.

In this case, it should be noted that the position posture R_Pi of the feature point P_i constituting the model pattern is expressed in the model pattern coordinate system.

Where the position posture of the feature point P_i which is seen from the picture image coordinate system is denoted as R_Pi' when the model pattern is superimposed on the image T_jg of the object shown in the input picture image I_j, R_Pi' is expressed as follows by using the position posture R_Pi of the feature point P_i which is seen from the model pattern coordinate system and the detected position R_Tjg of the image T_jg which is seen from the picture image coordinate system.

$R\_Pi' = R\_Tjg * R\_Pi$

For the sake of explanation below, the position of P_i which is seen from the picture image coordinate system is denoted as t_Pi', and the posture of P_i which is seen from the picture image coordinate system is denoted as v_Pi'.

In this case, the first label L1_jg (j=1 to NI, g=1 to NT_j) is given to the image T_jg of each object. In the first embodiment, those that can be selected as the label of the image of the object are two options, i.e., "OK" and "NG". In the first embodiment, from among the images of the detected objects, the first labels L1_jg of the images of all the objects of which degree of match is equal to or more than the threshold value are changed to "OK". From among the images of the detected objects, the first labels L1_jg of the images of the objects of which degree of match is less than a threshold value are changed to "NG".

In step S104, the user checks the image T_jg (j=1 to NI, g=1 to NT_j) of the object detected from each input picture image I_j (j=1 to NI), and corrects the label. The user checks the image of the object having "OK" attached thereto, and when the user determines that it is not the object, the user changes the first label to "NG", and the corrected label is stored. Further, the user checks the image of the object having "NG" attached thereto, and when the user determines that it is the object to be detected, the user changes the first label to "OK", and the corrected label is stored.

In the first embodiment, the user goes back and forth between the input picture image list screen displayed by the input image display unit 42 and the detection result list screen displayed by the detection result display unit 41 to check the image T_jg (j=1 to NI, g=1 to NT_j) of the object.

The input picture image list screen and the detection result list screen are displayed on the display apparatus. The two screens may be displayed side by side, or displayed by switching the screens. In the first embodiment, a method for displaying the two screens by switching the screens will be explained.

Figure 8:
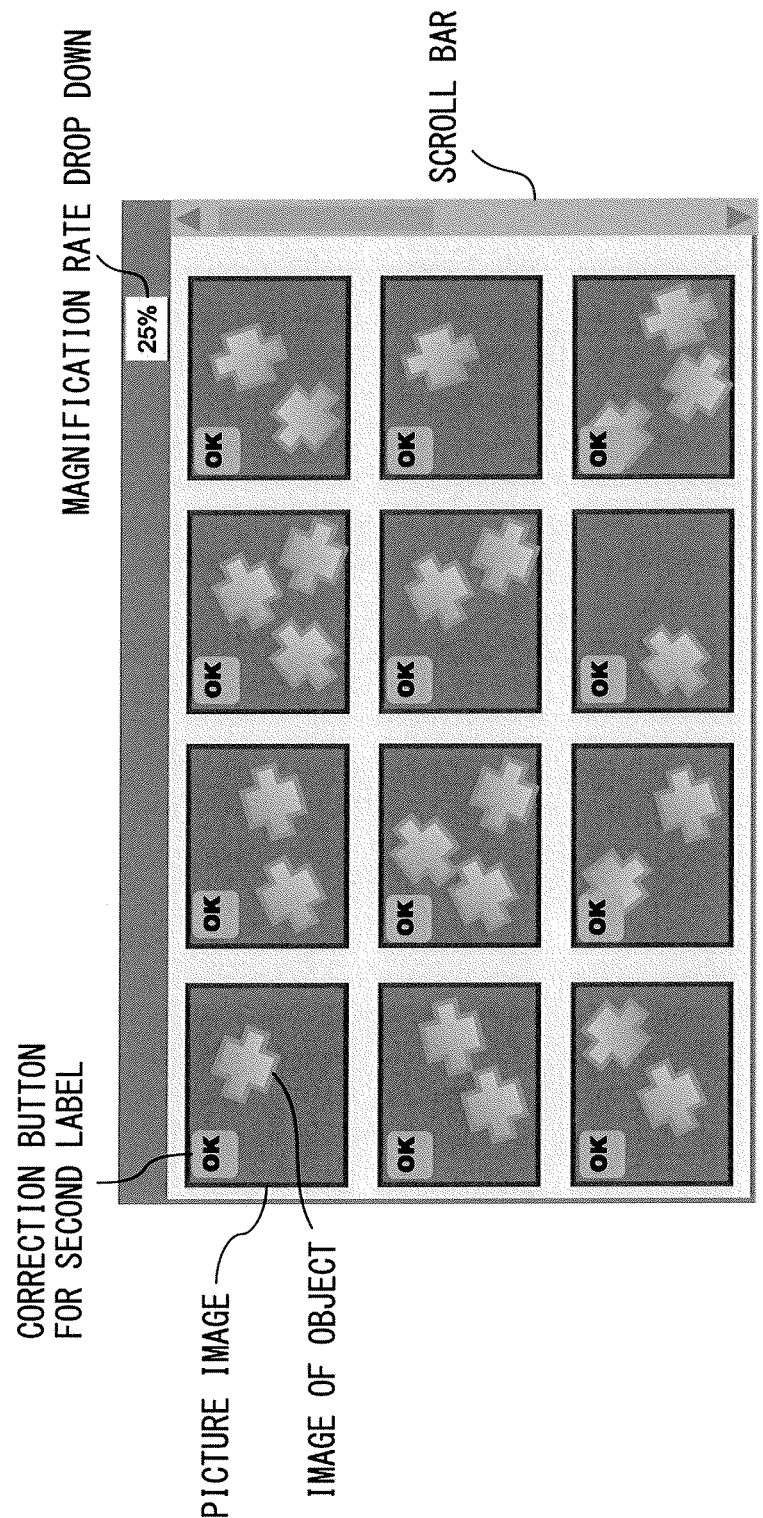
FIG. 8 is a diagram illustrating an example of display of an input picture image list screen.

FIG. 8 is a diagram illustrating an example of display of an input picture image list screen.

In the input picture image list screen, all the input picture images I_j (j=1 to NI) are listed and displayed as illustrated in FIG. 8. For example, display of this screen is performed in accordance with the following rule.

Input picture images are arranged and displayed with a designated magnification rate in the screen. In the first embodiment, all the sizes of the input picture images are the same, but the sizes of the input picture images may be different.

The number of rows or the number of lines of the picture image in the screen are automatically determined by the size of the screen, the size of the input picture image, and the magnification rate.

When all the picture images cannot be displayed, a scroll bar is displayed. The user can view all the picture images by scrolling the screen with the scroll bar. The scroll bar may be shown vertically or horizontally.

The display magnification rate of the input picture image can be designated with a magnification rate drop down. The input picture images may be displayed with a size larger than the original picture image or may be displayed with a size smaller than the original picture image.

A procedure for plotting a model pattern on an image of an object shown in an input picture image will be explained. Plotting of the model pattern may be preferably performed in accordance with the following procedure.

(1) The processing of (2) shown below is performed on all the input picture images I_j (j=1 to NI).

(2) The processing of (2-1) to (2-2) shown below is performed on the images T_jg (g=1 to NT_j) of all the objects detected from the input picture image I_j.

(2-1) The positions R_Pi' of all the feature points P_i (i=1 to NP) of the model pattern seen from the picture image coordinate system are calculated on the basis of the position R_Tjg of the image of the object.

(2-2) A point is plotted at the position R_Pi' of the input picture image I_j. When the first label L1_jg is "OK", the point is plotted in green. When the first label L1_jg is "NG", the point is plotted in red. The feature point P_i may not be plotted as a point, and instead, it may be plotted as a line segment. Therefore, the first label L1_jg is expressed as a series of feature points of the object displayed in green or red.

The second label will be explained.

Each input picture image has a second label L2_j (j=1 to NI).

A correction button for a second label is disposed at the upper left of each input picture image. The correction button for the second label may be disposed outside of the picture image, e.g., below the input picture image.

The second label L2_j is determined as follows on the basis of the first label L1_jg (g=1 to NT_j).

When the first labels L1_jg of the images of all the objects in the same input picture image are "OK", the second labels L2_j are set to "OK".

If the images of the objects in the same input picture image include even a single image of which first label L1_jg is "NG", the second label L2_j is set to "NG".

The correction button for the second label is displayed as follows.

The second label is displayed as a label displayed on the correction button for the second label.

When the second label is "OK", the background color of the correction button for the second label is green, and when the second label is "NG", the background color of the correction button for the second label is red.

When the correction button for the second label is clicked, the second label L2_j is toggled between "OK" and "NG". Accordingly, the first labels L1_jg of the images of all the objects in the same picture image are also changed to the same one as L2_j. In synchronization with the change in the first label L1_jg and the second label L2_j, the screen is also updated.

Figure 9:
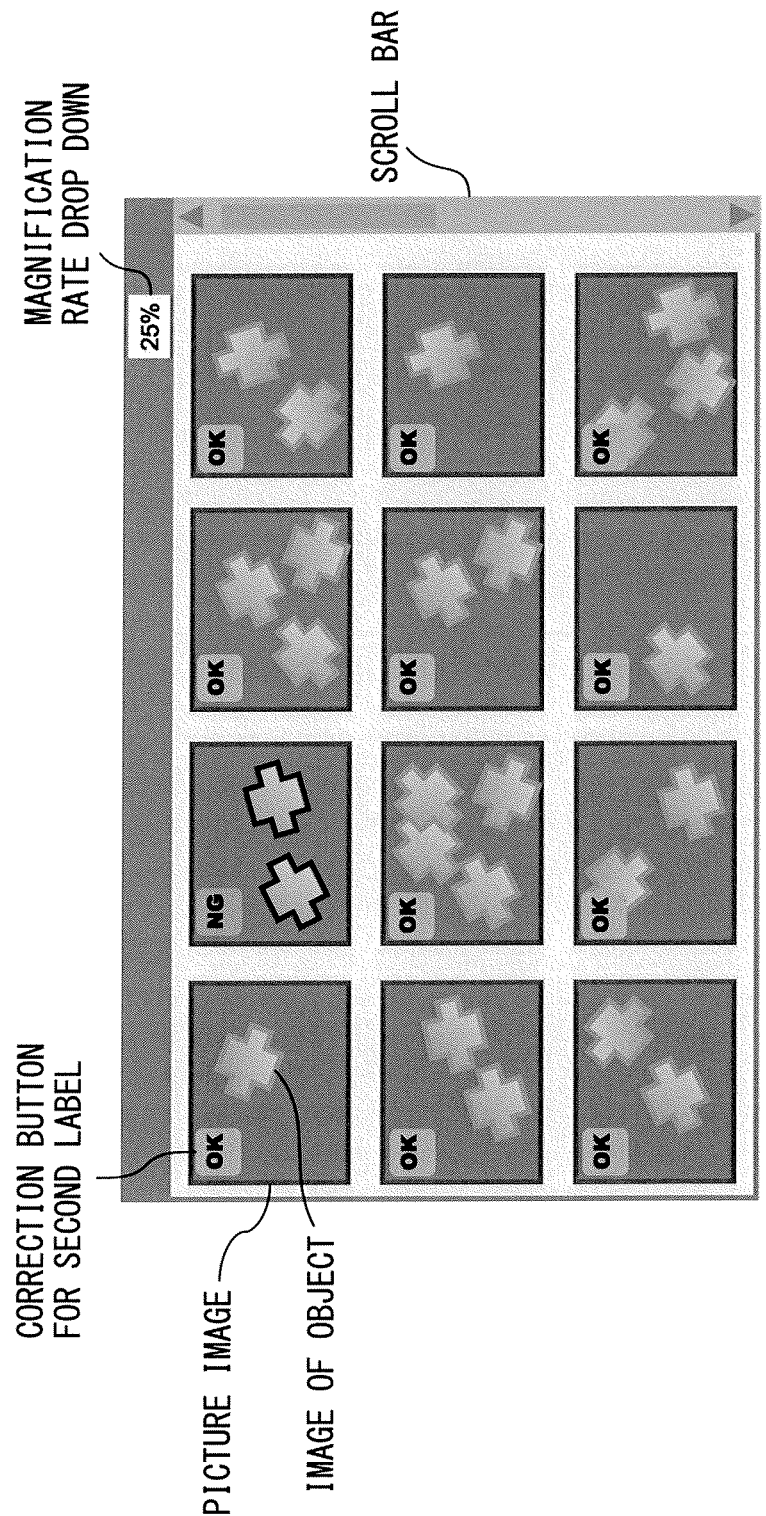
FIG. 9 is a diagram illustrating an example of display after a correction button for a second label is clicked in a state of FIG. 8.

FIG. 9 is a diagram illustrating an example of display after the correction button for the second label is clicked in the state of FIG. 8. The second label of the second picture image from the left in the first row changes from "OK" to "NG".

When the user clicks the input picture image I_j in the input picture image list screen, a detection result list screen displaying a list of detection results for that input picture image is displayed.

Figure 10:
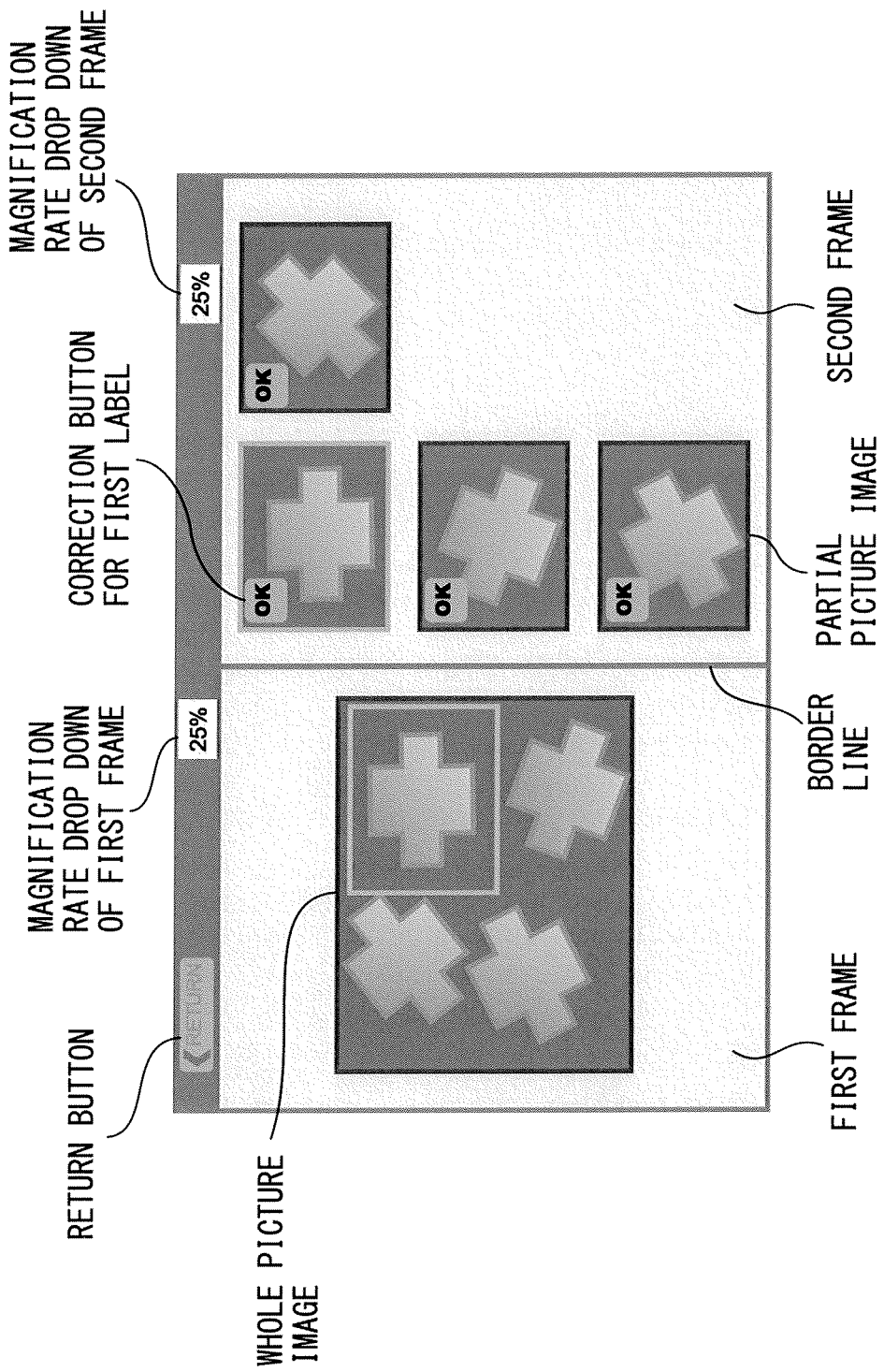
FIG. 10 is a diagram illustrating an example of display of a detection result list screen.

FIG. 10 is a diagram illustrating an example of display of a detection result list screen.

As illustrated in FIG. 10, in the detection result list screen, the images T_jg (g=1 to NT_j) of the objects in the selected input picture image I_j are listed and displayed as follows.

A first frame and a second frame are displayed in the detection result list screen.

In the first frame and the second frame, the display magnification rate of the picture image can be changed to a different rate.

The sizes of the first frame and the second frame can also be changed. For example, the sizes of the two frames can be changed by dragging the border line between the first frame and the second frame.

When the return button is clicked, the user can return to the input picture image list screen.

In the first frame, the whole picture image is displayed.

When a magnification rate drop down of the first frame is operated, the display magnification rate of the whole picture image can be changed.

When the whole picture image does not fit in the first frame, a scroll bar is displayed.

A model pattern can be plotted on the image of the detected object in the whole picture image in accordance with the same method as the method for plotting the model pattern on the picture image of the input picture image list screen.

A partial picture image is displayed in the second frame.

When the magnification rate drop down of the second frame is operated, the display magnification rate of the partial picture image can be changed.

When all the partial picture images do not fit in the second frame, a scroll bar is displayed. The scroll bar may be shown vertically or horizontally.

The partial picture image is generated for the image T_jg (g=1 to NT_j) of each object. The partial picture image is generated in accordance with the following procedure.

1. A model pattern is plotted on the picture of the detected object of the input picture image. To do this, the following processings (1-1) to (1-2) are to be performed on the image T_jg of the object.

(1-1) The position R_Pi' of all the feature points P_i (i=1 to NP) of the model pattern seen from the picture image coordinate system are calculated on the basis of the position R_Tjg of the image of the object.

(1-2) A point is plotted at the position R_Pi' of the input picture image I_j. When the first label L1_jg is "OK", the point is plotted in green. When the first label L1_jg is "NG", the point is plotted in red. The feature point P_i may not be plotted as a point, and instead, it may be plotted as a line segment.

2. A maximum value tx_Pi_max and a minimum value tx_Pi_min in X direction and a maximum value ty_Pi_max and a minimum value ty_Pi_min in Y direction of the position t_Pi'=(tx_Pi, ty_Pi) of all R_Pi' (i=1 to NP) that have been calculated are derived.

3. Where a shape in which a partial picture image is cropped from the input picture image is a rectangle, the rectangle is defined by the position at the upper left apex and the position at the upper right apex. Where the margin is α, the position of the upper left apex can be calculated as (tx_Pi_min−α, ty_Pi_min−α), and the position of the lower right apex can be calculated as (tx_Pi_max+α, ty_Pi_max+α). The margin a may be a value determined in advance, or may be calculated from the size of the picture image.

4. A picture image is cropped from the input picture image with the calculated rectangle, and the picture image is adopted as a partial picture image.

When the partial picture image is selected by the partial picture image selection unit 51, the partial picture image is made into a selection state to be displayed in a highlighted manner. For example, when the partial picture image is clicked, the partial picture image is displayed so that it is distinguished from other partial picture images, i.e., the partial picture image is displayed in a highlighted manner. In order to display the partial picture image in a highlighted manner, for example, the partial picture image may be enclosed by a frame line in a bright color. The image T_jg of the object corresponding to the partial image is also displayed in a highlighted manner in the whole picture image. In order to display the whole picture image in a highlighted manner, the image of the object may also be enclosed by a bright frame line. The shape of the frame line may be the same as the rectangle in which the partial picture image is cropped. Alternatively, it may be displayed in a highlighted manner by changing the color in which the model pattern is plotted. Further, when the whole picture image is zoomed in, and only a portion of the whole picture image is displayed, the whole picture image may be automatically scrolled so that the operator can check the image of the object displayed in a highlighted manner.

Each partial picture image is associated with the first label L1_jg (j=1 to NI, g=1 to NT_j).

A correction button for the first label is disposed at the upper left of each partial picture image. The correction button for the first label may be disposed outside of the picture image, e.g., immediately below the partial picture image.

A first label ("OK" or "NG") is displayed on the correction button for the first label.

When the first label is "OK", the background color of the correction button for the first label is green, and when the first label is "NG", the background color of the correction button for the first label is red.

When the correction button for the first label is clicked, the first label L1_jg is toggled between "OK" and "NG". In synchronization with the change in the first label L1_jg, the screen is also updated.

Figure 11:
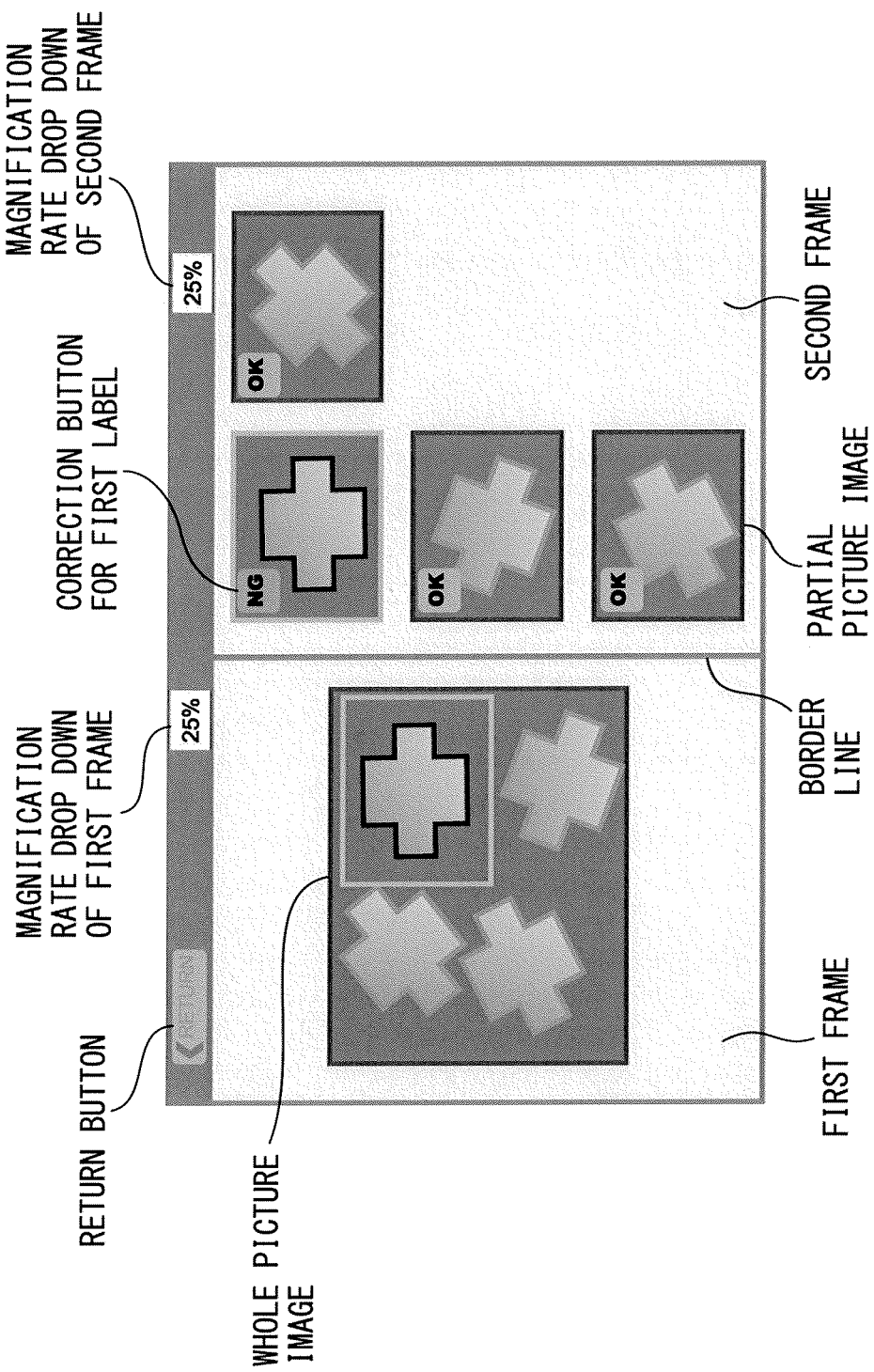
FIG. 11 is a diagram illustrating a display screen after the correction button for a first label is clicked in a state of FIG. 10.

FIG. 11 is a diagram illustrating a display screen after the correction button for the first label is clicked in the state of FIG. 10. The upper left partial picture image in the second frame and the feature point of the object in the first frame corresponding to the partial picture image is changed from green to red. The correction button for the first label displayed in association with the upper left partial picture image in the second frame is changed from "OK" to "NG".

Figure 12:
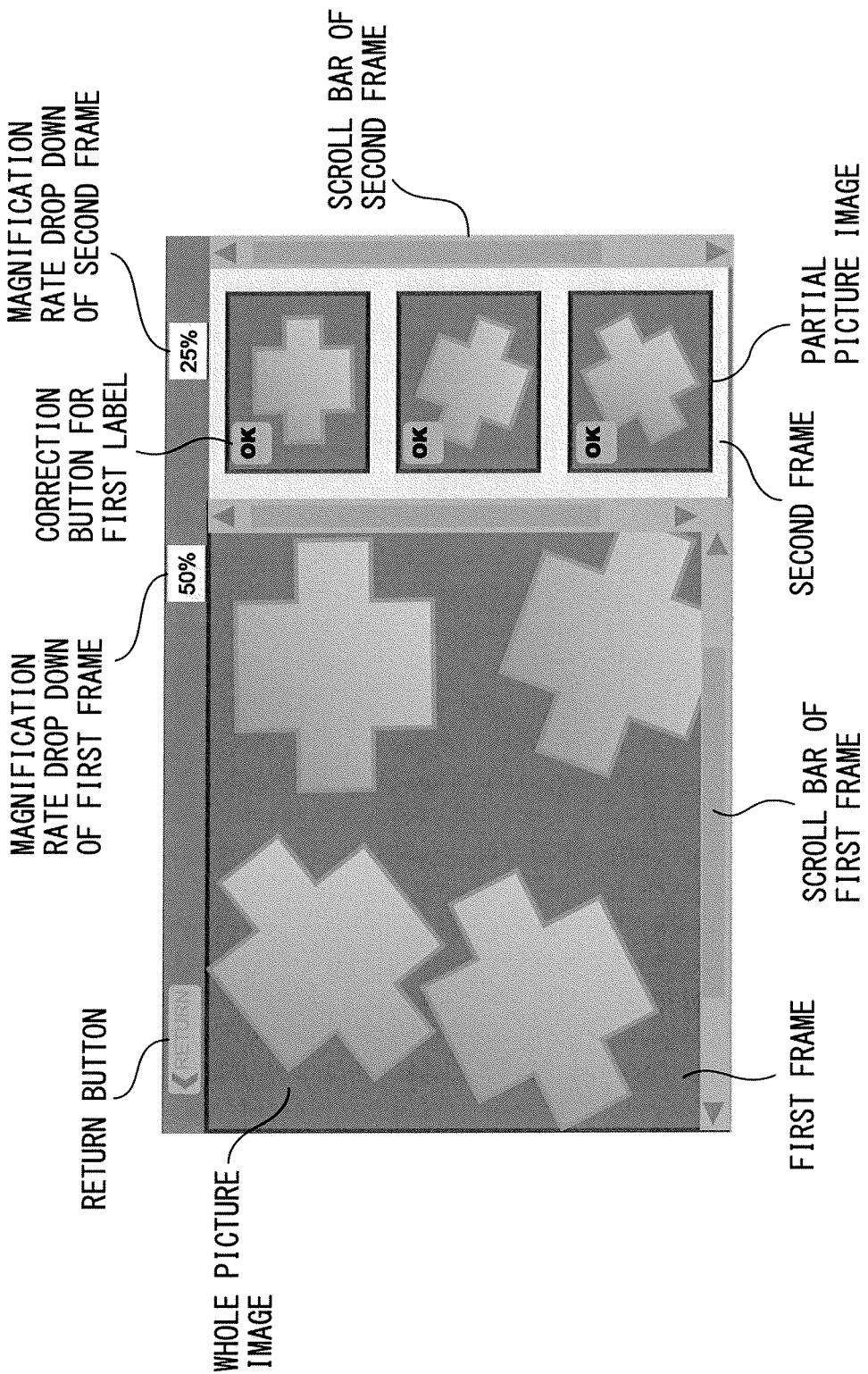
FIG. 12 is a diagram illustrating another example of display of the detection result list screen.

FIG. 12 is a diagram illustrating another example of display of a detection result list screen.

As illustrated in FIG. 12, in another example of display, the first frame can be enlarged, and the second frame can be reduced. In this example, the magnification rate of the first frame is 50%, and the magnification rate of the second frame is 25%. In such a configuration, in the second frame, the user can roughly check the entire image of each object in the second frame, and when the user wants to check further into details, the user can check the image in the first frame.

Figure 13:
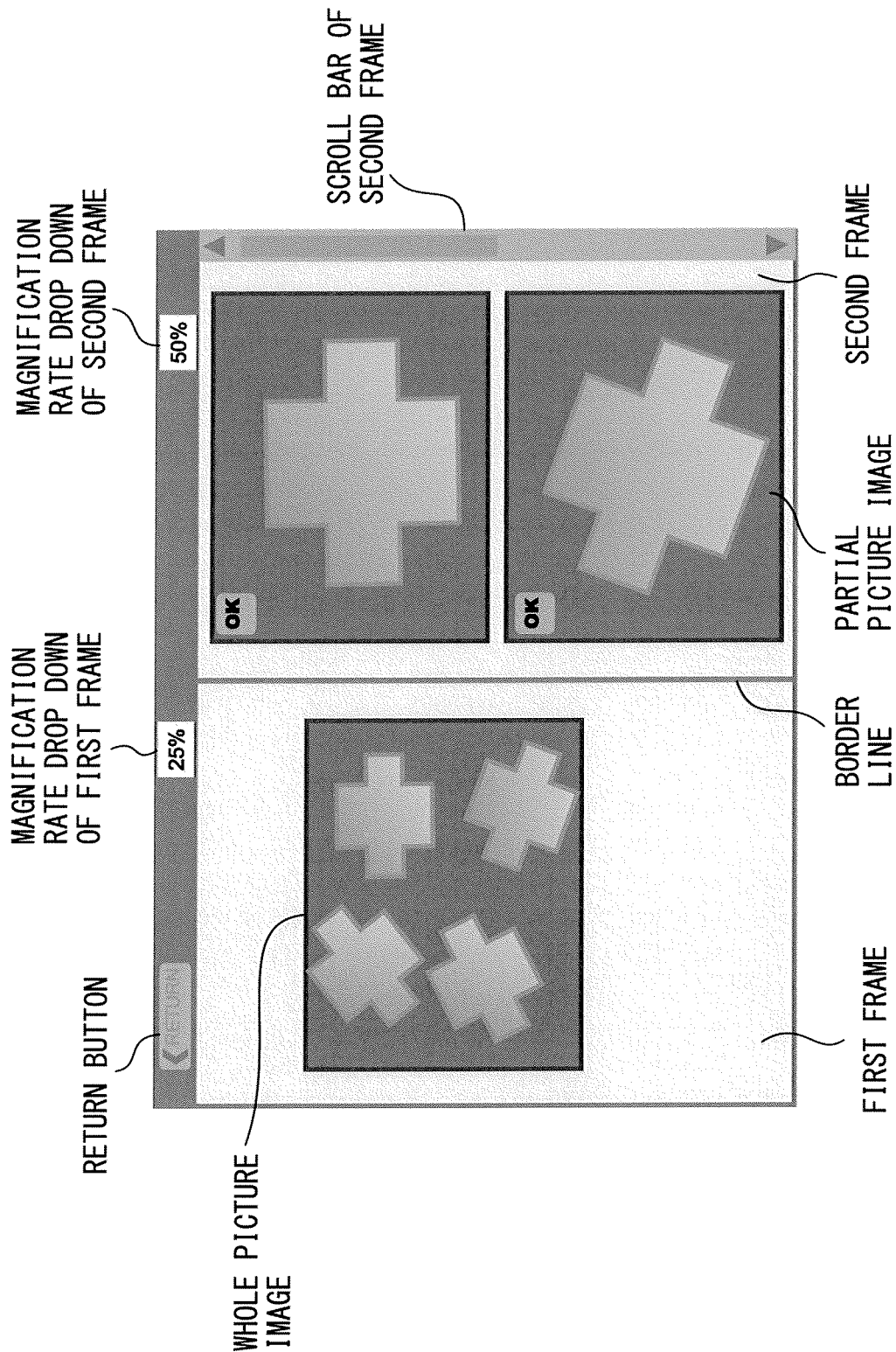
FIG. 13 is a diagram illustrating still another example of display of the detection result list screen.

FIG. 13 is a diagram illustrating still another example of display of a detection result list screen.

As illustrated in FIG. 13, in a still another example of display, the magnification rate of the first frame may be reduced, and the magnification rate of the second frame can be enlarged. In this example, the magnification rate of the first frame is 25%, and the magnification rate of the second frame is 50%. According to such a configuration, the user can check the image of the object in detail by displaying the image in an enlarged manner in the second frame, and the user can find which position the object is located in the whole picture image in the first frame.

Figure 14:
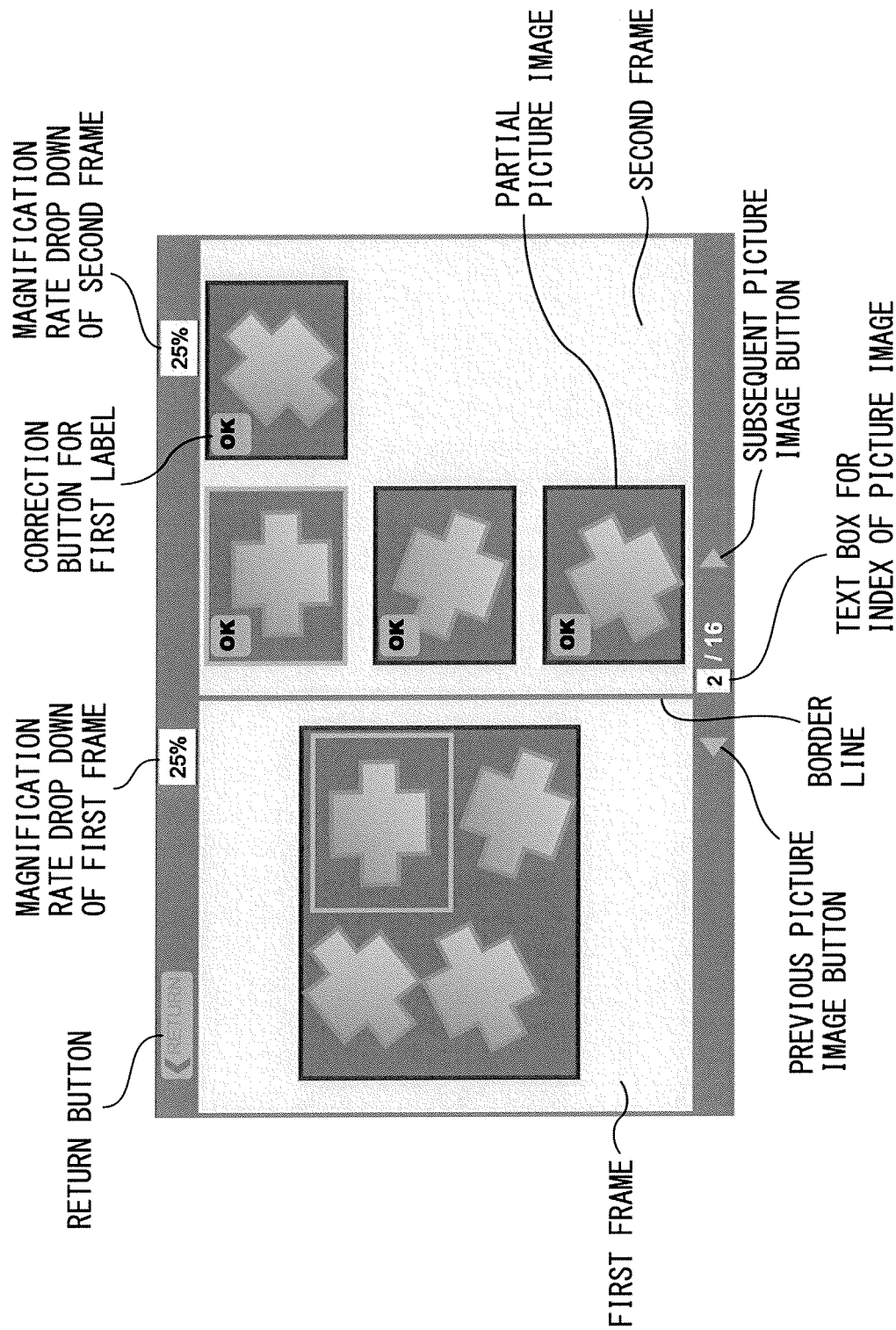
FIG. 14 is a diagram illustrating still another example of display of the detection result list screen.

FIG. 14 is a diagram illustrating still another example of display of a detection result list screen.

In the example of FIG. 14, a previous picture image button, a subsequent picture image button, and a text box for an index of a picture image are added to the lower part of the detection result list screen.

When the previous picture image button is pressed, a previous input picture image I_j−1, which is a picture image previous to the input picture image I_j, and detection results T_j−1g (g=1 to NT_j−1) are displayed.

When the subsequent picture image button is pressed, a subsequent input picture image I_j+1, which is a picture image subsequent to the input picture image I_j, and detection results T_j+1g (g=1 to NT_j+1) are displayed.

When an integer value x is input into the text box for the index of the picture image, the input picture image I_x and the detection results T_xg (g=1 to NT_x) are displayed.

Accordingly, another input picture image and the detection results for the picture image can be displayed on the detection result list screen without returning to the input picture image list screen.

Figure 15:
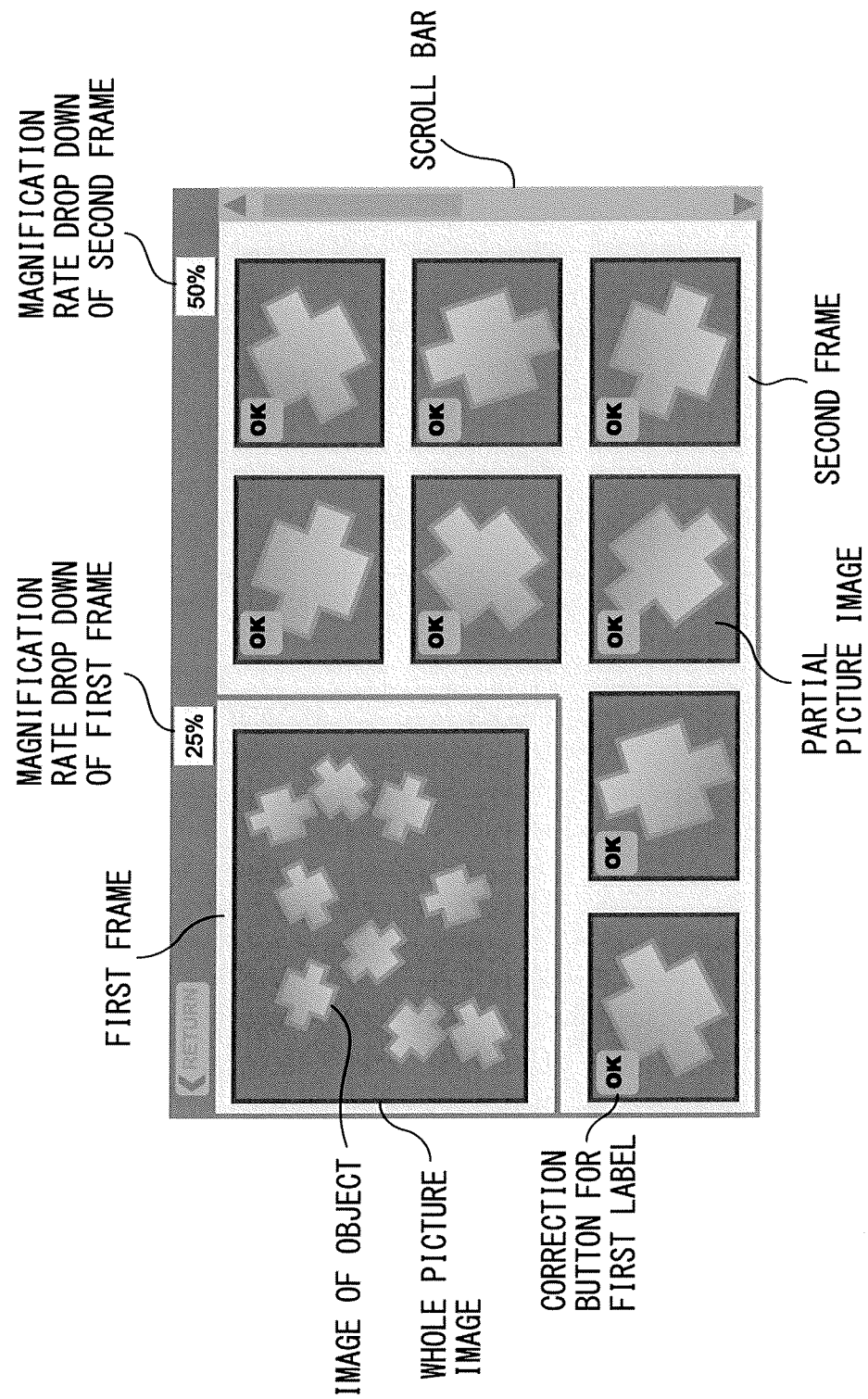
FIG. 15 is a diagram illustrating still another example of display of the detection result list screen.

FIG. 15 is a diagram illustrating still another example of display of a detection result list screen.

The arrangement of the first frame and the second frame may not be not only a side by side arrangement but also a vertical arrangement. The first frame and the second frame may also be arranged as illustrated in FIG. 15. With such an arrangement, more images of objects can be arranged and displayed as partial picture images.

In step S105, multiple data sets including the image T_jg (j=1 to NI, g=g=1 to NT_j) of the detected objects and the first labels L1_jg are adopted as learning data, and the learning unit 22 performs machine learning or statistical processing. The processing performed by the learning unit 22 including the case of the second embodiment will be explained later.

The following case can be considered as a modification of the image processing device according to the first embodiment.

Multiple model patterns may be held, and a name is given to each model pattern. A name of a matching model pattern is used in the label. When the label is corrected, the label is selected with the drop down box.

Instead of defining a model pattern with multiple feature points, the model pattern may be defined as a form of a template picture image. In this case, an object is detected by using a technique such as normalized correlation. When a template picture image is used as a model pattern, a feature point cannot be plotted; therefore, it is necessary to express a detection result, e.g., by plotting a rectangle around the image of the object.

The label is corrected by using a check box or a text box instead of a button. When the check box is used, only two values can be designated. When the text box is used, any given character string can be input.

The magnification rate is switched with a slider instead of a drop down.

The operator does not determine the magnification rate. Instead, the magnification rate is automatically determined from the screen size and the picture image size.

Instead of plotting a feature point of a model pattern on a picture image, a center position of a model pattern or a rectangle enclosing a model pattern is plotted. Plotting may be performed by combining them. The center position and the rectangle enclosing the model pattern can be defined manually by the user, or may be automatically set when the model pattern is generated.

When many picture images are displayed on the input picture image list screen, the user switches the picture image to be displayed by switching the page instead of scrolling with the scroll bar. For example, when there are 100 picture images, 9 picture images are displayed on a single page, and the images are displayed upon being divided into 12 pages. In the second frame of the detection result list screen, the same method may be used.

A method for cropping a partial picture image of a detection result list screen may be as follows.

1. A rectangle enclosing a model pattern is defined in advance. This rectangle may be automatically defined when a model pattern is taught, or may be defined manually by the operator. The rectangle is defined by the position posture of an apex U1 at a left end of the rectangle, and a width U_W, and a height U_H. The position posture of the apex U1 which is seen from the model pattern coordinate system is defined with a homogeneous transformation matrix R_U1.

2. A position posture R_U1' of the apex U1 which is seen from the picture image coordinate system is calculated on the basis of the position R_Tjg of the image of the object.

3. A partial picture image is cropped by using the position posture R_U1' of the apex U1 in the picture image coordinate system, the width U_W, and the height U_H.

In this case, the image of the object on the partial picture image is displayed with the same posture. It is to be understood that a shape in which a partial picture image is cropped may not be a rectangle.

Figure 16:
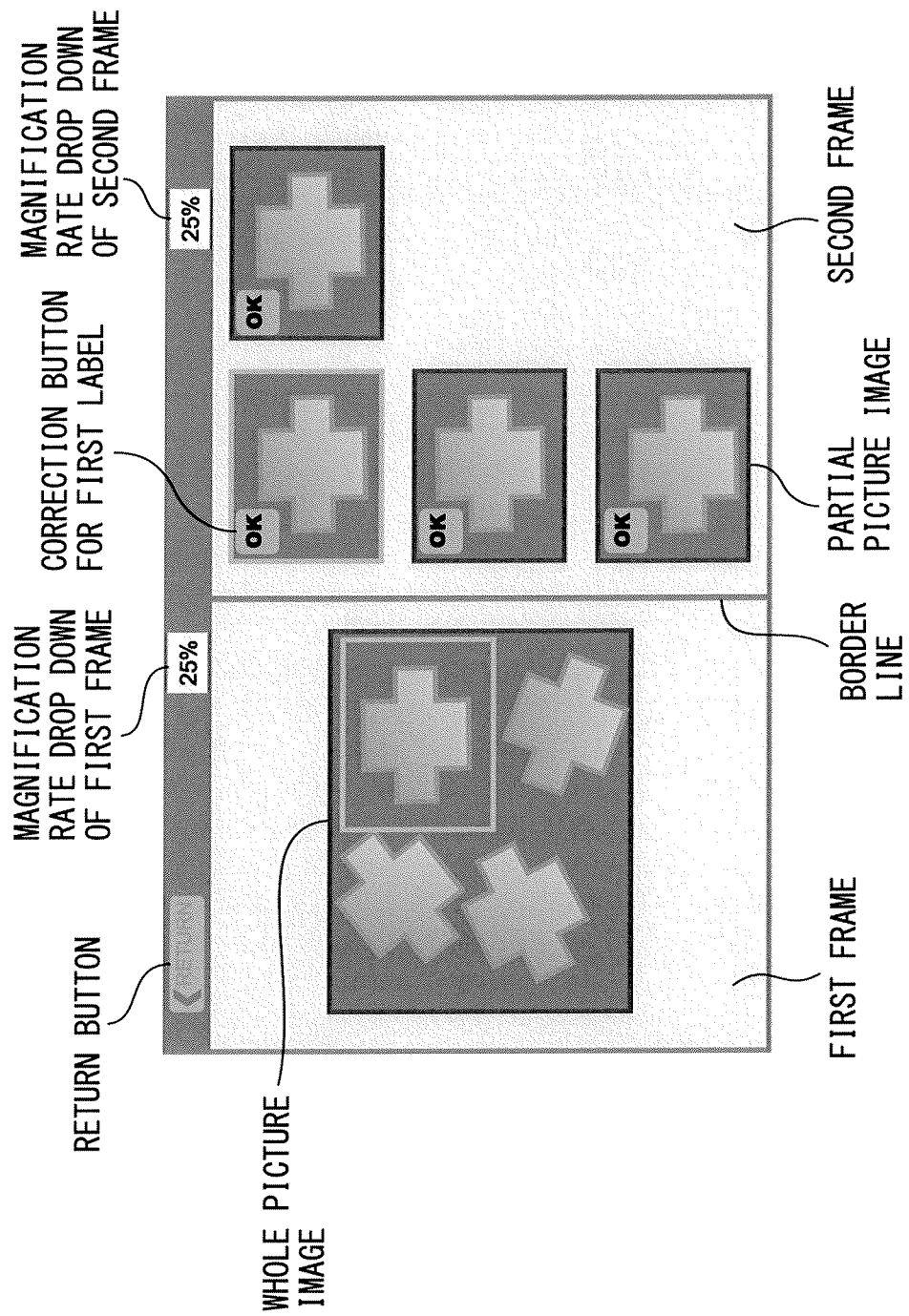
FIG. 16 is a diagram illustrating an example of display of the detection result list screen when respective images of objects on partial picture images are displayed in the same posture.

FIG. 16 is a diagram illustrating an example of display of a detection result list screen when images of objects on a partial picture image are displayed with the same posture.

Images of objects of different sizes may be displayed at a time. In this case, images of objects may be displayed as the same size, or may be displayed with the original size ratio.

Figure 17:
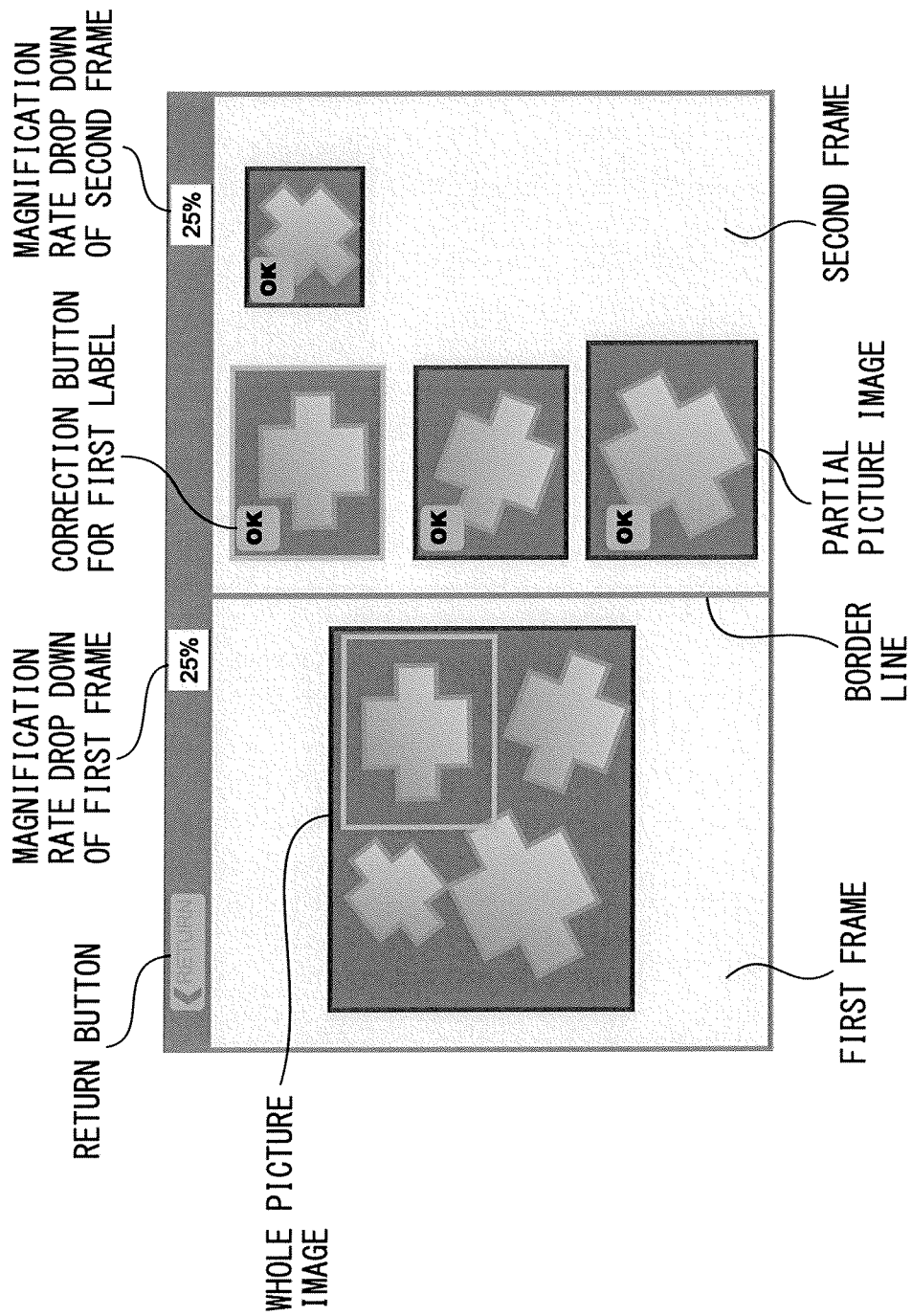
FIG. 17 is a diagram illustrating an example of display of the detection result list screen when images of objects of different sizes are displayed at a time with the original size ratio.

FIG. 17 is a diagram illustrating an example of display of a detection result list screen when images of objects of different sizes are displayed at a time with the original size ratio.

Figure 18:
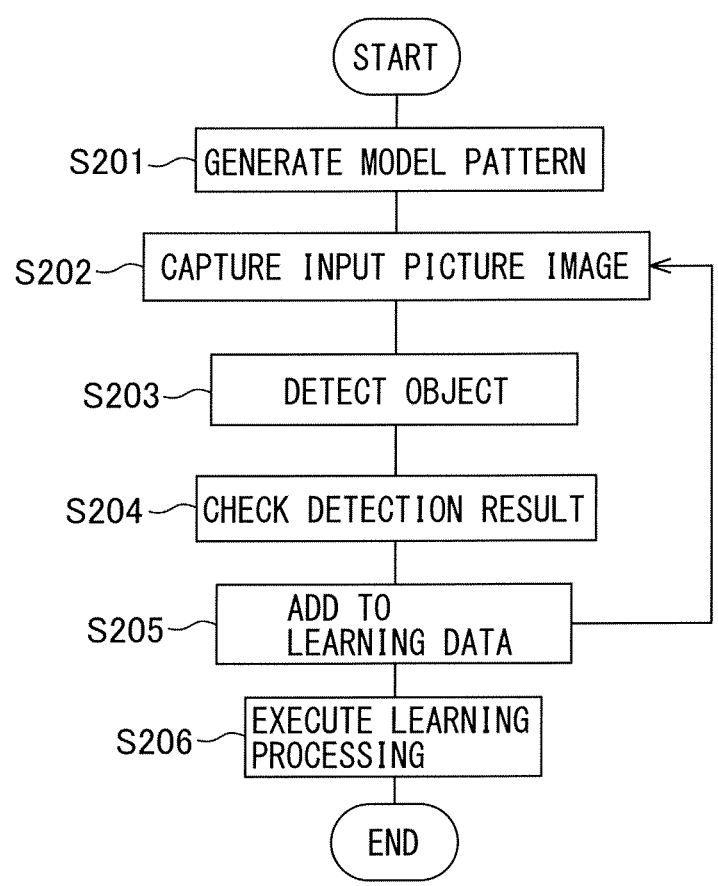
FIG. 18 is a flowchart illustrating a flow of processing of an image processing device according to a second embodiment.

FIG. 18 is a flowchart illustrating a flow of processing of an image processing device according to the second embodiment.

The image processing device according to the second embodiment includes the same hardware configuration as the image processing device according to the first embodiment, and a portion of the processing is different from that of the first embodiment. In the explanation about the second embodiment, first, for example, a case where the learning unit 22 performs statistical processing will be explained.

Figure 19:
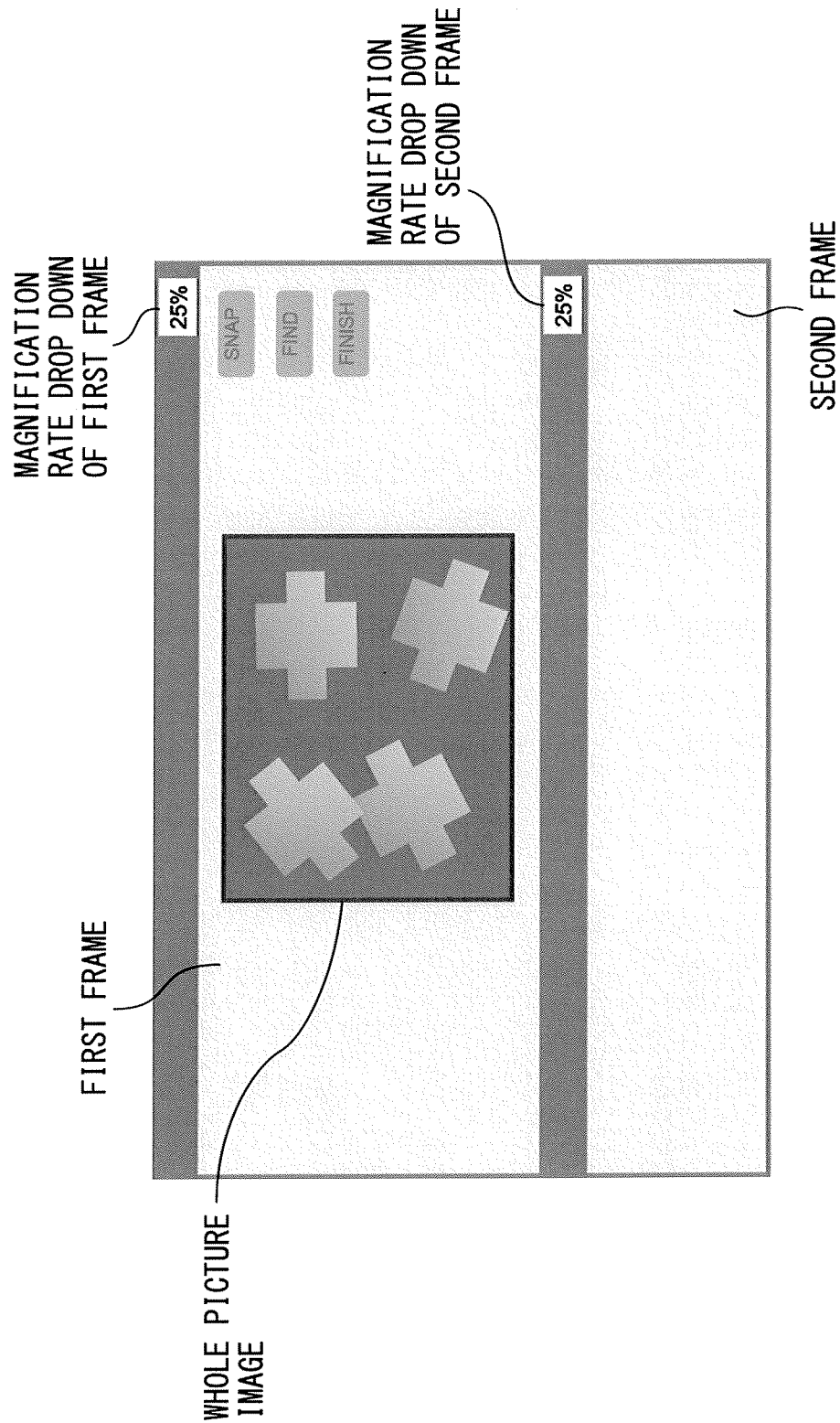
FIG. 19 is a diagram illustrating an example of display of a detection result list screen used in the second embodiment.

FIG. 19 is a diagram illustrating an example of display of a detection result list screen used in the second embodiment.

In the screen of FIG. 19, a first frame and a second frame are arranged vertically next to each other. A SNAP button, a FIND button, and a FINISH button are disposed at the right side of the first frame.

In step S201, the same processing as step S101 of the first embodiment is performed.

In step S202, an object is placed within a visual field of the visual sensor 11, and the user presses the SNAP button to capture an input picture image. The image of the object shown in the input picture image I_j preferably includes a variation that may cause a problem in the detection. When, as a result of checking the input picture image I_j, the user determines that the input picture image I_j is not preferable as learning data, the user may press the SNAP button again to capture the input picture image I_j again. The captured picture image is displayed as the whole picture image in the first frame. At this point in time, the object is not detected, and therefore, a model pattern is not plotted on the image of the object in the whole picture image, and the partial picture image is not displayed either. At this time, only the first frame may be displayed, and the second frame may not be displayed.

In step S203, when the FIND button is pressed, an object is detected from the input picture image I_j. The processing of the detection may be performed in the same manner as step S103 of the first embodiment. However, in this case, a detection is made from only a single input picture image I_j.

In step S204, the images T_jg (g=1 to NT_j) of the objects detected from the input picture image I_j are listed and displayed in a detection result list screen.

Figure 20:
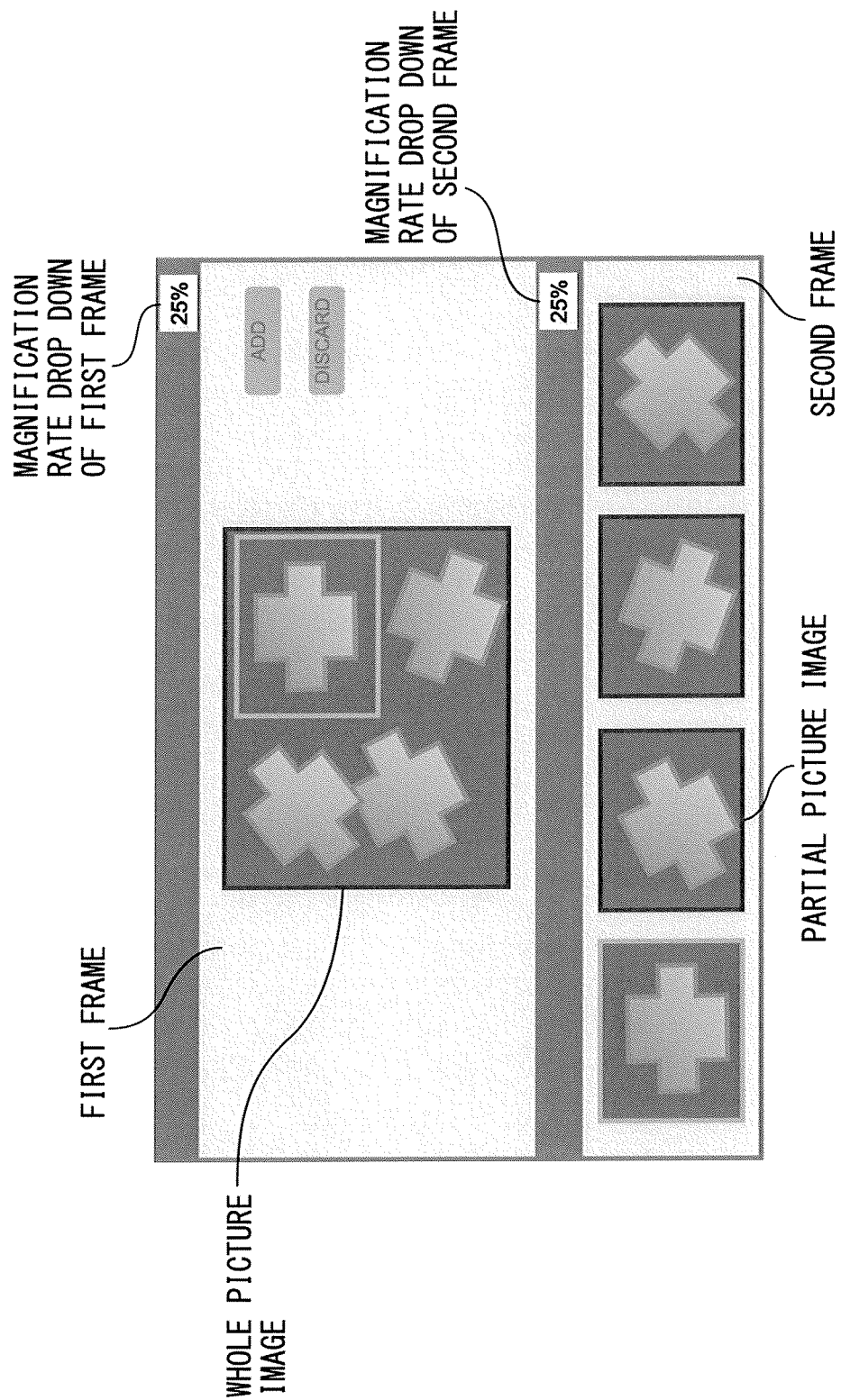
FIG. 20 is a diagram illustrating an example of display of the detection result list screen displayed in step S204.

FIG. 20 is a diagram illustrating an example of display of a detection result list screen displayed in step S204.

The whole picture image and the partial picture image may be displayed in the same manner as the first embodiment. At the right side of the first frame, the SNAP button and the FIND button are hidden, and an ADD button and a DISCARD button are added. The operator checks the whole picture image and the partial picture image displayed on the detection result list screen, and like the first embodiment, the user checks whether there is a problem in the detection result or not.

Further, in step S204, like the detection result list screen of the first embodiment, the first label is allowed to be corrected.

Figure 21:
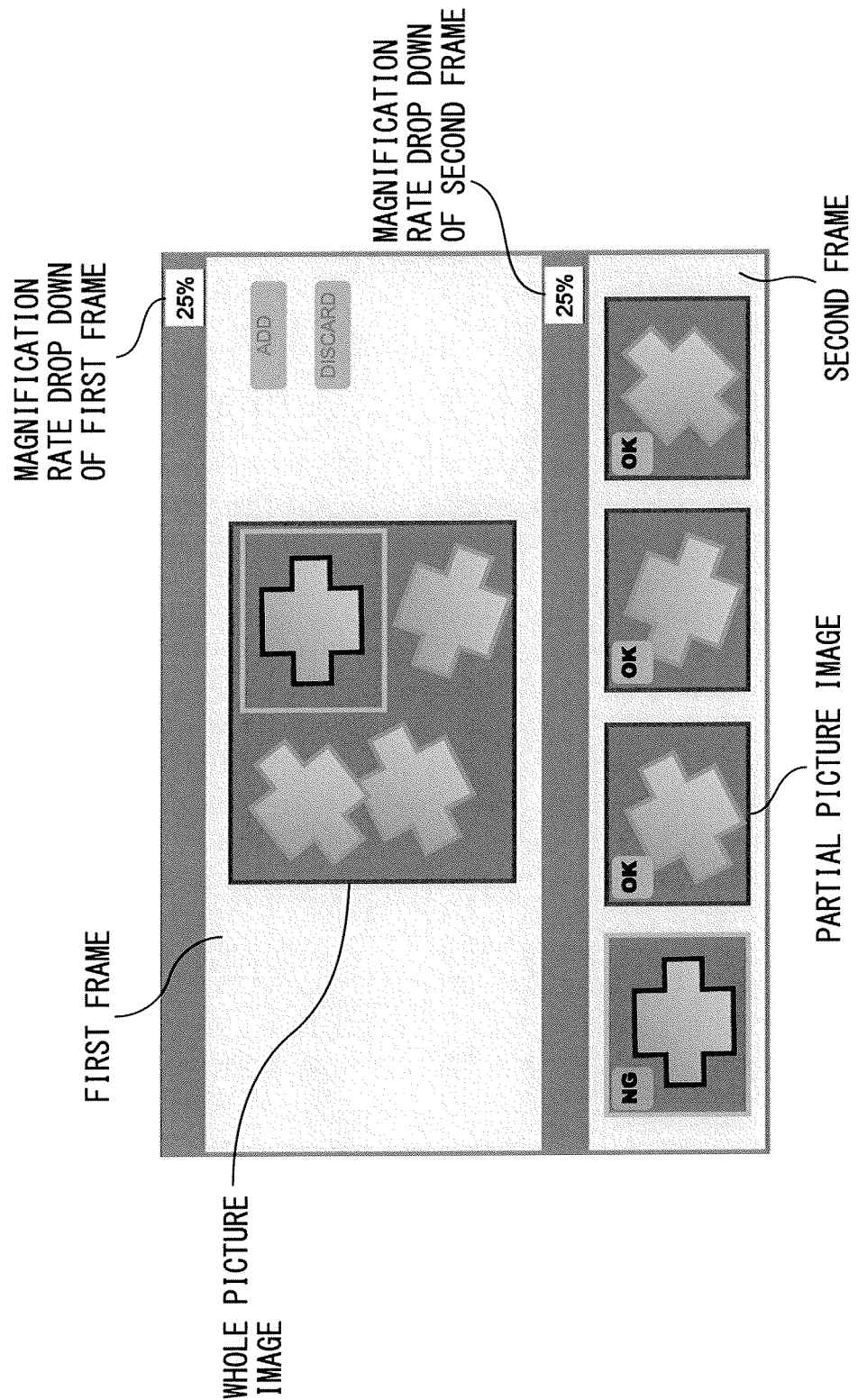
FIG. 21 is a diagram illustrating an example of display of the detection result list screen when a first label is corrected.

FIG. 21 is a diagram illustrating an example of display of a detection result list screen when a first label is corrected.

In this case, the user checks the image of the object having "OK" attached thereto, and when the user determines that it is not the object, the user changes the first label to "NG", and the corrected label is stored. Further, the user checks the image of the object having "NG" attached thereto, and when the user determines that it is the object to be detected, the user changes the first label to "OK", and the corrected label is stored.

In step S205, the user determines whether the images T_jg (g=1 to NT_j) of the objects are to be added to the learning data, and when the images T_jg (g=1 to NT_j) of the objects are determined to be added to the learning data, the user presses the ADD button to associate the images T_jg (g=1 to NT_j) and the first labels L1_jg (g=1 to NT_j) of the objects with the input picture image I_j, and adds them to the learning data. When the images T_jg (g=1 to NT_j) of the objects are determined not to be added to the learning data, the user presses the DISCARD button to discard the input picture image I_j and the images T_jg and the first labels L1_jg of the objects. In any of the cases where the user presses the ADD button and the DISCARD button, the processing is started from step S202 again.

When sufficient learning data has been added, the user presses the FINISH button and the processing proceeds to step S206.

In this case, before proceeding to S206, a step of using the input picture image list screen and the detection result list screen to check and correct the first labels L1_jg (j=1 to NI, g=1 to NT_j) of the images T_jg (j=1 to NI, g=1 to NT_j) of the objects corresponding to all the input picture images I_j (j=1 to NI) added to the learning data may be added just like step S104 of the first embodiment.

In step S206, on the basis of the collected learning data, just like step S105 of the first embodiment, multiple data sets including the images T_jg (j=1 to NI, g=1 to NT_j) and the first labels L1_jg (j=1 to NI, g=1 to NT_j) of the objects are adopted as learning data, and the learning unit 22 performs the statistical processing.

Hereinafter, the statistical processing performed by the learning unit 22 according to the first and second embodiments will be explained.

The learning unit 22 performs learning so that the images T_jg (j=1 to NI, g=1 to NT_j) of the objects are correctly determined to be objects that correspond to the model pattern. In other words, the learning unit 22 performs learning so that correct determination can be made as to whether an image of an object is included or not when a partial picture image that is considered to include an image of an object is input. Conventionally, the object detection unit 21 detects an object from the input picture image, so that a certain level of precision has been obtained, but as a result of learning by the learning unit 22, the precision of the detection is further improved. In this case, the object detection unit 21 makes a detection, and a partial picture image that is considered to be suitable for being adopted as a learning target and that include an image of an object of which first label is "OK" is stored to the learning data storage unit 32. When the operation processing performance of the learning unit 22 is sufficiently high, an input picture image may be input instead of a partial picture image for detecting objects. The learning unit 22 performs statistical processing on multiple partial picture images stored in the learning data storage unit 32 to improve the model pattern.

The applicant of the present application has disclosed a technique for improving the model pattern by performing statistical processing on multiple images of objects detected on the basis of a model pattern in Japanese Patent Application No. 2015-218357, and, for example, the learning unit 22 may be realized with a technique using statistical processing disclosed in Japanese Patent Application No. 2015-218357. However, the statistical processing executed by the learning unit 22 is not limited thereto.

The first and second embodiments in which the learning unit 22 executes statistical processing have been hereinabove explained. Subsequently, a case where the learning unit 22 performs machine learning (supervised learning) will be explained.

The learning unit 22 performs machine learning to improve a probability that the object detection unit 21 detects an object. In this case, the correct detection means that an object that is truly an object is correctly determined to be an object, an object that is not an object is correctly determined not to be an object, and a detection failure of failing to detect an object even though it is an object does not occur, and a false detection of determining an object that is actually not an object is an object does not occur. In order to perform such learning, it is preferable that partial picture images ("OK" "OK") that are determined by the image processing device 10 to be images of objects in an input picture image and for which the user checks that the determination is correct, partial picture images ("OK" "NG") that are determined by the image processing device 10 to be images of objects in an input picture image but for which the user checks that the determination is incorrect, partial picture images ("NG" "OK") that are determined by the image processing device 10 not to be images of objects in an input picture image but for which the user checks that the determination is incorrect, and partial picture images ("NG" "NG") that are determined by the image processing device 10 not to be images of objects in an input picture image and for which the user checks that the determination is correct are of similar ratios as learning data in order to efficiently perform the learning. Therefore, in the first and second embodiments in which the learning unit 22 performs the statistical processing, a partial picture image having a history in which a first label is changed from "NG" to "OK" and a partial picture image having a history in which a first label is changed from "OK" to "NG" are associated with each history and stored to the learning data storage unit 32. These are the partial picture image ("NG" "OK") and the partial picture image ("OK" "NG"). Further, the operator selects partial picture images suitable for learning data from among the partial picture images ("OK" "OK") that are determined to be images of objects in an input picture image and for which the determination is maintained and the partial picture images ("NG" "NG") that are determined not to be images of objects in an input picture image and for which the determination is maintained, and stores them as the partial picture image ("OK" "OK") and the partial picture image ("NG" "NG") into the learning data storage unit 32. But the embodiment is not limited thereto, and partial picture images may be randomly collected and used as learning data. The partial picture images of "NG" "NG" may be used as learning data.

The learning unit 22 has a function of extracting useful rules, knowledgeable equations, determination references, and the like existing in a set of input data by means of analysis, outputting a determination result thereof, and performing learning (machine learning) of knowledge. There are various techniques for machine learning, but when roughly divided, the techniques can be divided into, for example, "supervised learning", "unsupervised learning" and "reinforced learning", but in this case the "supervised learning" is used. Further, in order to achieve these techniques, there is a technique called "deep learning" for learning extraction of a feature value itself. For such machine learning (machine learning apparatus 20), a general-purpose calculator or a processor may be used, but when GPGPU (General-Purpose computing on Graphics Processing Units), a large scale PC cluster, and the like may be applied, so that processing can be performed with a higher speed.

In the supervised learning, many sets of data including any given input and a result (label) are given to the learning unit 22, so that features in the data sets are learned, and a model for estimating a result from an input, i.e., a relationship thereof is recursively obtained. When this supervised learning is applied to the embodiment, for example, the learning unit 22 can be realized by using an algorithm such as a neural network.

Figure 22:
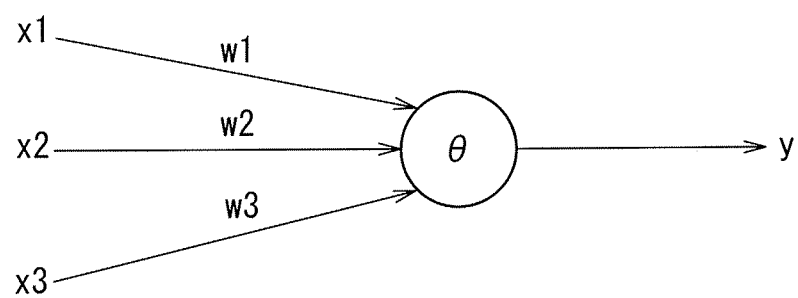
FIG. 22 is a diagram schematically illustrating a model of neurons.
Figure 23:
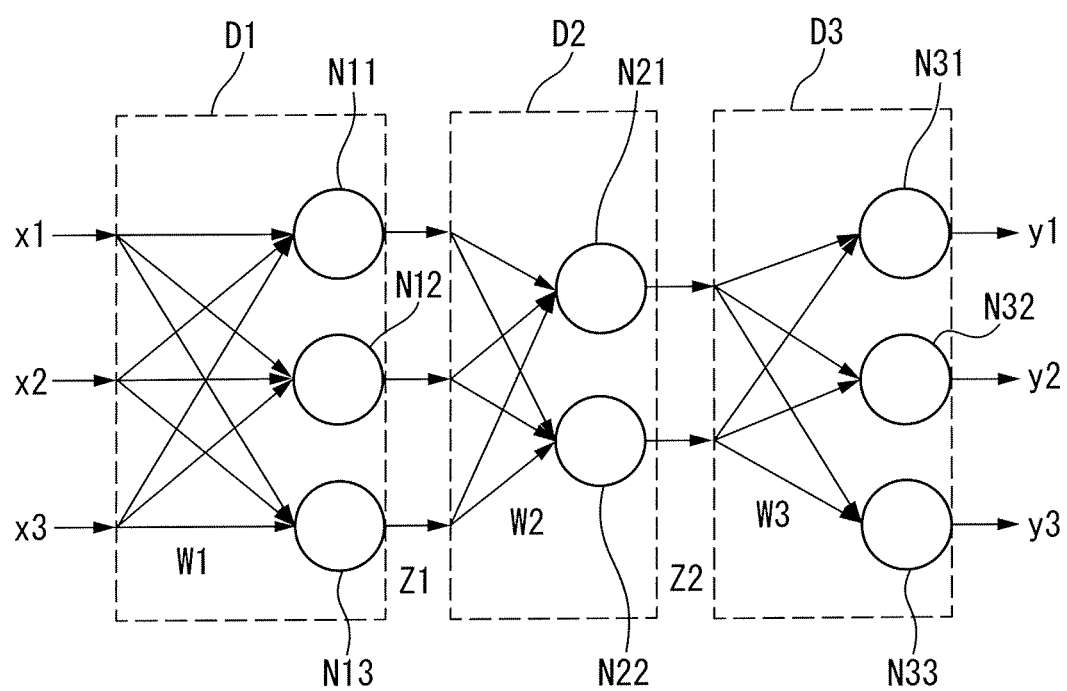
FIG. 23 is a diagram schematically illustrating a three-layer neural network configured by combining neurons as illustrated in FIG. 22.

A neural network can be used as an approximation algorithm of a value function in supervised learning. FIG. 22 is a diagram schematically illustrating a model of a neuron, and FIG. 23 is a diagram schematically illustrating a three-layer neural network configured by combining neurons as illustrated in FIG. 22. More specifically, the neural network is constituted by, for example, an arithmetic apparatus and a memory that simulate a model of neurons as illustrated in FIG. 22.

As illustrated in FIG. 22, a neuron outputs an output (result) y in accordance with multiple inputs x (for example, an input x1 to an input x3 in FIG. 22). The inputs x (x1, x2, x3) are respectively multiplied by weights w (w1, w2, w3) corresponding to the inputs x. Accordingly, the neuron outputs the result y expressed by the following equation. It should be noted that all of the inputs x, the result y, and the weights w are vectors. In the following equation, θ denotes a bias, and $f_k$ denotes an activation function.

$$y = f_k(\Sigma_{i=1}^n x_i w_i - \theta)$$

The three-layer neural network constituted by combining the neurons as illustrated in FIG. 22 will be explained with reference to FIG. 23. As illustrated in FIG. 23, multiple inputs x (in this case, for example, the input x1 to the input x3) are input from the left-hand side of the neural network, and the results y (in this case, for example, the result y1 to the input y3) are output from the right-hand side. More specifically, the inputs x1, x2, and x3 are input into three neurons N11 to N13 upon being multiplied by corresponding weights for neurons N11 to N13, respectively. The weights by which the inputs are multiplied are collectively referred to as w1.

The neurons N11 to N13 output z11 to z13, respectively. In FIG. 23, z11 to z13 are collectively referred to as a feature vector z1, and can be deemed as a vector obtained by extracting the feature value of the input vector. This feature vector z1 is a feature vector between the weight w1 and the weight w2. z11 to z13 are input into two neurons N21 and N22 upon being multiplied by corresponding weights for neurons N21 and N22, respectively. The weights by which the feature vectors are multiplied are collectively referred to as w2.

The neurons N21 and N22 output z21 and z22, respectively. In FIG. 23, these z21 and z22 are collectively referred to as a feature vector z2. This feature vector z2 is a feature vector between the weight w2 and the weight w3. z21, z22 are input into three neurons N31 to N33 upon being multiplied by corresponding weights for neurons N31 to N33, respectively. The weights by which the feature vectors are multiplied are collectively referred to as w3.

Finally, the neurons N31 to N33 output the result y1 to the result y3, respectively. Operations of the neural network include a learning mode and a value prediction mode. For example, in the learning mode, the weight W is learned by using the learning data set, and by using the parameter, a behavior determination of a robot is performed in the prediction mode. For the sake of convenience, it is described as a prediction, but it is to be understood that various tasks, e.g., detection, classification, and inference can be performed.

In this case, data obtained by actually operating the robot in the prediction mode may be immediately learned and reflected in a subsequent behavior (online learning), and collective learning by using a data group collected in advance may be performed, and thereafter the detection mode may be continuously performed with the same parameter (batch learning). Alternatively, in an intermediate manner, every time a certain amount of data is accumulated, the learning mode may be interposed.

The weights w1 to w3 can be learned through backpropagation. It should be noted that information about an error enters from the right-hand side and flows to the left-hand side. The backpropagation is a technique for adjusting (learning) a weight for each neuron so as to reduce the difference between the output y and the true output y (supervisor) when the input x is input.

In such a neural network, the number of layers can be increased to three or more layers (which is referred to as deep learning). An arithmetic apparatus performing feature extraction of inputs in a stepwise manner and recursively deriving a result can be automatically obtained from only the supervisor data.

Figure 24:
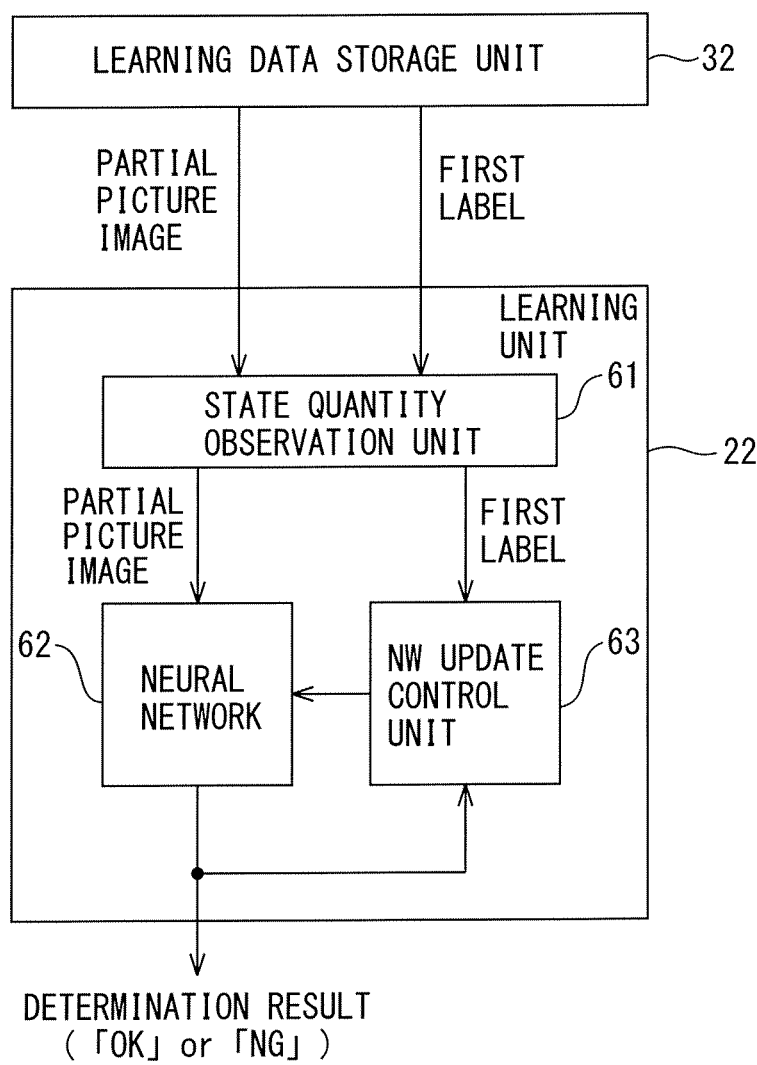
FIG. 24 is a diagram illustrating a schematic configuration of a learning unit 22 according to the first and second embodiments.

FIG. 24 is a diagram illustrating a schematic configuration of the learning unit 22 according to the first and second embodiments.

The learning unit 22 includes a state quantity observation unit 61, a neural network 62, and a neural network (NN) update control unit 63. As described above, the learning unit 22 is realized with, for example, GPGPU (General-Purpose Computing on Graphics Processing Units).

The state quantity observation unit 61 receives, from the learning data storage unit 32, a data set including a partial picture image and first labels of images of objects included therein. The learning data storage unit 32 stores an extremely large number of data sets, and transmits the data sets to the state quantity observation unit 61 in order.

The neural network 62 is a neural network for performing deep learning, and calculates a determination result ("OK" "NG") in response to a partial picture image given by the state quantity observation unit 61. In the neural network 62, the weight for each neuron can be adjusted (learned) by the NN update control unit 63.

The NN update control unit 63 compares a determination result ("OK" "NG") calculated by the neural network 62 in accordance with the partial picture image given by the state quantity observation unit 61 and the first label (supervisor data) of the partial picture image, and performs update control for changing the weight for each neuron of the neural network 62 so as to increase a probability that the comparison result matches.

It should be noted that the contents processed by the learning unit 22 are not limited to the above contents. In general, in the supervised machine learning, a function of mapping an input to an output (label) corresponding thereto is learned. The first and second embodiments disclose a unit for inputting an input picture image and an image of an object detected, and quickly correcting a label which is an output thereof. The method for learning a function for mapping from the input and the output may be any methods.

The embodiments have been hereinabove explained, but the detection result list screen has the following features.

The detection result list screen is constituted by two frames including a first (upper) frame and a second (lower) frame.

A partial picture image obtained by cropping an image of an object individually detected is displayed in the second frame.

An image of an object is displayed on the whole picture image in the first frame. However, the arrangement of the frames is not particularly limited, and the frames may be arranged either vertically or horizontally, or in any other arrangement.

The display magnification rate of each frame can be independently changed.

When an image of an object is selected in the second frame, an image of a corresponding object in the upper frame is highlighted.

Further, when only a portion of a picture image is displayed in the first frame, the whole picture image may be scrolled so that the image of the selected object is displayed.

When the image of the object is selected in the first frame, the image of the corresponding object is selected in the second frame.

In the second frame, labels (OK/NG and the like) of detection results and correctness and incorrectness determination results can be corrected.

The above display screen has the following advantages.

In the second frame, the user can perform checking focusing on an image of an object which is a target without being annoyed by images of other objects in the same picture image.

When the label of the detected object is changed, the user can easily identify an image of an object to which a button, a text box, and the like belongs.

The user can easily find which position in the picture image each image of the detected object is located.

In the first frame, an image of an object is displayed in the whole picture image in an enlarged manner, and in the second frame, images of objects are displayed in a reduced manner, so that in the first frame, the user can check an image of an object in detail, and in the second image, the user can roughly check each of the entire objects.

On the contrary, in the second frame, an image of each object may be displayed in an enlarged manner, and in the first frame, the whole picture image may be displayed in a reduced manner, so that in the second frame, the user can check an image of an object in detail, and the first frame can show which position in the whole picture image the object is located.

Further, the operator may want to check detection results or determination results for multiple picture images. For example, this includes the following cases.

The operator may want to check whether there is any incorrect detection for captured picture images during production.

The operator may want to perform detection on multiple picture images after a detection parameter is changed, and the operator may want to determine whether detection has been correctly performed on all the picture images or not.

When an existing correctness and incorrectness determination result is used as learning data in order to perform machine learning of a parameter for making a determination in a correctness and incorrectness determination, the operator may want to check whether the existing correctness and incorrectness determination result is correct or not, and if incorrect, the operator corrects a determination result (label).

When the operator checks detection results for multiple picture images as described above, it is effective to use a method in which reduced picture images of multiple picture images are arranged and displayed on an input picture image list screen, detection results are plotted on the picture images, and when the operator checks further into details, the operator selects a picture image to transition to an input picture image list screen in which the operator checks a detection result for each picture image explained above.

Further, a configuration described in the claims and an effect thereof are as follows.

An image processing device according to the invention includes an object detection unit for detecting one or more images of objects from an input picture image in which the objects have been captured, on the basis of a model pattern of the object, and a detection result display unit for graphically superimposing and displaying a detection result on each image thus detected. The detection result display unit includes a first frame for displaying the entire input picture image, and a second frame for listing and displaying one or more partial picture images each including an image detected from the input picture image. In the input picture image displayed in the first frame, a detection result is superimposed and displayed on all the detected images, and in the partial picture image displayed in the second frame, a detection result of an image corresponding to each partial picture image is superimposed and displayed.

According to this configuration, in the first frame, the following points can be checked in the whole picture image.

Where and how the image of the object is shown.

How many images of objects are shown.

Whether images of multiple objects have been detected from the same portion.

In the second frame, the user can perform checking focusing on an image of an object which is a target without being annoyed by images of other objects in the same picture image.

The first frame and the second frame are displayed in the same window at a time, so that the image of the object can be checked while making use of the above advantages at the same time. Accordingly, the images of multiple objects shown in the picture image can be checked in a short time.

As described in International Publication No. 2001/041068, a method for displaying a whole picture image in the first frame, and displaying a detection result in a table format in the second frame may be considered. However, in this method, it is difficult to find a relationship between a row of a table expressing a detection result and an image of an object on the picture image. As compared with checking a detection result by using characters in the table format, the method of seeing the partial picture image allows the user to more intuitively check the image of the object.

The detection result display unit further superimposes and displays, on the partial picture image displayed in the second frame, first label information stored in association with an image corresponding to each partial picture image, and allows an operator to change the first label information on the basis of an operation performed by the operator.

When a unit for operating a label is provided on the partial picture image in the second frame, it is easier to find the relationship between the image of the object and the operation unit for the label. The labels can be corrected without performing an operation of selecting an object. For example, in the method described in International Publication 2001/041068, it is necessary to correct a label after selecting an object. There may be another method including highlighting, on a whole picture image, an image of an object corresponding to a detection result when a detection result is displayed in a table format and a row of the table is selected, and providing a unit for correcting a label on a row of the table. In this method, however, it is necessary to select a row of a table in order to check an picture image. There may be still another method of providing a unit for operating a label on a whole picture image in a first frame, but in this method, when images of objects are overlapping or adjacent to each other, it is difficult to find a correspondence relationship between the operation unit and the image of the object.

The detection result display unit displays picture images in the first frame and the second frame with a setting magnification rate for each of them.

First, in the first frame, the entire image of an object may be configured to be enlarged and displayed in a whole picture image, and in the second frame, images of objects may be configured to be reduced and displayed. In this case, the user can check the image of the object in detail by displaying the image in an enlarged manner in the first frame, and the user can roughly check the entire image of each object in the second frame. Subsequently, in the second frame, an image of each object may be configured to be displayed in an enlarged manner, and in the first frame, images of all the objects may be configured to be displayed in a reduced manner. In this case, in the second frame, the user can check an image of an object in detail by enlarging and displaying the image of the object. In the first image, the user can find which position in the whole picture image the object is located. As described above, the user checks the image of the object at a time with different magnification rates for the same object, so that the user can check the image of the object in a shorter time.

The detection result display unit includes a partial picture image selection unit for selecting one of a plurality of the partial picture images displayed in the second frame, and in the input picture image displayed in the first frame, a detection result of an image of an object corresponding to the partial picture image selected by the partial picture image selection unit (51) is displayed in a highlighted manner.

According to this configuration, the user can easily check a correspondence relationship between an image of an object displayed in the whole picture image in the first frame and an image of an object displayed in the partial picture image in the second frame.

The detection result display unit superimposes, on the input picture image displayed in the first frame, the first label information corresponding to each of the one or more images detected from the input picture image.

According to this configuration, even in the whole picture image in the first frame, the user can check information about the label. This is useful when it is difficult to check the image of the object with only the partial picture image. For example, when the image of the object is showing a portion of an item, it may be difficult to check the positional relationship of the image of the object with respect to the entire item. In such a case, the user can easily check the image of the object by displaying label information in the whole picture image in the first frame.

The image processing device includes a detection result storage unit associating a plurality of input picture images with detection results of one or more images of the objects detected from each of the plurality of input picture images and storing them, and an input picture image selection unit for selecting one of the plurality of input picture images, and the detection result display unit displays the one of the input picture images selected by the input picture image selection unit and a detection result stored in the detection result storage unit in association with the one of the input picture images.

According to this configuration, the user can check multiple picture images on the detection result display unit without going back and forth between the input picture image display unit and the detection result display unit. For example, a subsequent picture image button is prepared as an input picture image selection unit on the detection result display unit, so that the user can successively change picture images in the detection result display unit.

The image processing device includes an input picture image display unit listing and displaying the plurality of input picture images stored in the detection result storage unit upon superimposing one or more images and detection results of the objects detected from the input picture images. The detection result display unit displays the input picture image selected by the input picture image selection unit, and enables switching between the input picture image display unit and the detection result display unit on the basis of an operation performed by an operator.

With the input picture image display unit, detection results for a plurality of picture images are listed and displayed, so that the user can guess a picture image which seems to have a problem, and when the user wants to check the picture image further into details, the user can check only the detection result for that picture image with the detection result display unit. As a result, the user can intuitively proceed to a screen for checking a detection for a particular picture image from among many picture images.

The detection result storage unit associates second label information with a plurality of input picture images and stores them, and the input picture image display unit further superimposes and displays the second label stored in association with each of the plurality of input picture images and allows an operator to change the second label information, and when the operator changes the second label information of one of the input picture images, the first label information respectively corresponding to the images of the plurality of objects stored in association with the input picture image are collectively changed.

According to this configuration, when a detection result can be checked by just checking each picture image with the input picture image display unit, the user can correct a label of a detection result without moving to the detection result display screen. For example, when the image of the object is displayed in a sufficiently large size with the input picture image display unit, the user does not have to check it in the detection result display screen. However, if a plurality of detection results are displayed in the picture image, this method can be used only when all the detection results are changed to the same label. When only a single detection result is displayed in the picture image, the user is likely to check it with only the input picture image display unit. In this case, since there is only a single label, it is not necessary to move to the input picture image display unit in order to correct each label. With such a function, no matter whether there are a single detection result or a plurality of detection results in a picture image, the same method can be used to cope with the issue.

The image processing device includes a learning data storage unit adding first label information to each of the detected images, associating them with each other to make learning data, and storing the learning data, and a learning unit performing machine learning or statistical processing on the basis of the learning data.

According to this configuration, a detection or correctness and incorrectness determination is made on an image of an object, so that the accuracy of adding the first label information is improved.

In the display achieved with the image processing device according to the present invention, there is an advantage in that a detection result and a correctness and incorrectness determination result about an object detected from an input picture image can be easily checked.

What is claimed is:

1. An image processing device comprising:
a processor for selecting a model pattern of an object, and using the selected model pattern to detect one or more images of a plurality of objects from an input picture image in which the plurality of objects have been captured by a camera; and
a display controlled by the processor for graphically superimposing and displaying a detection result on each image thus detected,
wherein the display includes:
a first frame for displaying the entire input picture image in which the plurality of objects have been captured by the camera; and
a second frame for listing and displaying a plurality of partial picture images each including a single respective one of the plurality of objects separately cropped from the input picture image, such that each of the plurality of objects are displayed separately in the second frame, and wherein:
in the input picture image displayed in the first frame, a detection result determined based on a degree of match between the detected images and the model pattern is superimposed and displayed on all the detected images, in each of the plurality of partial picture images listed and displayed in the second frame, a respective detection result determined based on a degree of match between the each of the plurality of partial picture images and the model pattern is superimposed and displayed on an image corresponding to each of the plurality of partial picture images, and the first frame and the second frame are displayed simultaneously, wherein the display further superimposes and displays, on the partial picture image displayed in the second frame, first label information stored in association with an image corresponding to each partial picture image, the first label information indicates:
a match decision made by the processor when the degree of match between the detected images and the model pattern is larger than or equal to a threshold value, and
a non-match decision made by the processor when the degree of match between the detected images and the model pattern is less than the threshold, and
wherein the display allows an operator to:
perform a confirmation of the match decision and the non-match decision made by the processor by maintaining the first label information, and perform an override of the match decision and the non-match decision made by the processor by manually changing the first label information, and wherein when the operator performs the override, then the processor is configured to perform a learning process to update the model pattern based on the override of the match decision, the override of the non-match decision, the confirmation of the match decision, and the confirmation of the non-match decision as learning data.

2. The image processing device according to claim 1, wherein the display displays picture images in each of the first frame and the second frame with a setting magnification rate for the first frame and the second frame.

3. The image processing device according to claim 1, wherein the display selects one of a plurality of the partial picture images displayed in the second frame, and
in the input picture image displayed in the first frame, a detection result of an image of an object corresponding to the partial picture image selected is displayed in a highlighted manner.

4. The image processing device according to claim 1, wherein the display superimposes, on the input picture image displayed in the first frame, the first label information corresponding to each of the one or more images detected from the input picture image.

5. The image processing device according to claim 1, wherein the image processing device associates a plurality of input picture images with respective detection results of one or more images of the objects detected from each of the plurality of input picture images and storing the plurality of input picture images and the respective detection results, and selects one of the plurality of input picture images, and
the display displays the one of the input picture images selected and one of the respective detection results in association with the one of the input picture images.

6. The image processing device according to claim 5, wherein the image processing device lists and displays the plurality of input picture images upon superimposing one or more images and the respective detection results of the objects detected from the input picture images, and
wherein the display displays the input picture image selected, and enables switching between the input picture image display and the detection result on the basis of an operation performed by an operator.

7. The image processing device according to claim 6, wherein the processor associates second label information with a plurality of input picture images and stores the second label information and the plurality of input picture images, and
the display further superimposes and displays the second label stored in association with each of the plurality of input picture images and allows an operator to change the second label information, and when the operator changes the second label information of one of the input picture images, the first label information respectively corresponding to the images of the plurality of objects stored in association with the input picture image are collectively changed.

8. The image processing device according to claim 1, wherein the processor adds the first label information to each of the detected images, associating each first label information with each of the detected images to make learning data, and storing the learning data; and performs machine learning or statistical processing on the basis of the learning data.

* * * * *